US010049517B2

(12) United States Patent
Geiszler

(10) Patent No.: US 10,049,517 B2
(45) Date of Patent: Aug. 14, 2018

(54) WIRELESSLY CHARGED ELECTRONIC LOCK WITH OPEN/CLOSED STATUS REPORTING

(71) Applicant: FP Wireless LLC, San Jose, CA (US)

(72) Inventor: Theodore D. Geiszler, Monte Sereno, CA (US)

(73) Assignee: FP Wireless, LLC, San Jose, CA (US)

( * ) Notice: Subject to any disclaimer, the term of this patent is extended or adjusted under 35 U.S.C. 154(b) by 0 days.

(21) Appl. No.: 15/844,000

(22) Filed: Dec. 15, 2017

(65) Prior Publication Data

US 2018/0114389 A1 Apr. 26, 2018

Related U.S. Application Data

(63) Continuation-in-part of application No. 15/639,861, filed on Jun. 30, 2017, now Pat. No. 9,876,387, and a continuation-in-part of application No. 15/008,159, filed on Jan. 27, 2016, now Pat. No. 9,876,386, and a continuation-in-part of application No. 15/280,534, filed on Sep. 29, 2016.

(51) Int. Cl.

| | |
|---|---|
| ***H01M 10/44*** | (2006.01) |
| ***H01M 10/46*** | (2006.01) |
| ***G07C 9/00*** | (2006.01) |
| ***H02J 7/02*** | (2016.01) |

(52) U.S. Cl.
CPC .......... *G07C 9/00309* (2013.01); *H02J 7/025* (2013.01); *G07C 2009/00603* (2013.01); *G07C 2009/00642* (2013.01)

(58) Field of Classification Search
CPC .......... H02J 7/025; H02J 5/005; H02J 7/0042; H02J 7/355
USPC ...... 320/107, 108, 114, 115; 70/1, 262, 271, 70/277; 340/5.6, 5.61, 5.65
See application file for complete search history.

(56) References Cited

U.S. PATENT DOCUMENTS

| | | | |
|---|---|---|---|
| 3,938,018 | A | 2/1976 | Dahl |
| 5,733,313 | A | 3/1998 | Barreras, Sr. et al. |
| 7,113,070 | B2 | 9/2006 | Deng et al. |
| 8,294,302 | B2 | 10/2012 | Peabody et al. |
| 8,354,914 | B2 | 1/2013 | Buckingham et al. |

(Continued)

FOREIGN PATENT DOCUMENTS

| | | |
|---|---|---|
| AU | 1998052770 | 7/1998 |
| CN | 2797546 Y | 7/2006 |

(Continued)

OTHER PUBLICATIONS

Assa Abloy ICPT Product Materials, Assa Abloy, Nov. 2012.

(Continued)

*Primary Examiner* — Edward Tso
(74) *Attorney, Agent, or Firm* — CanaanLaw, P.C.; David B. Ritchie

(57) ABSTRACT

A wirelessly charged battery powered electronic door locking system utilizes a first radio frequency to wirelessly transmit a wireless charging signal from an electronic control module to an electronic lock module mounted with the door. A rechargeable battery associated with the electronic lock module powers the electronic lock module and is recharged thereby. An RFID reader may be coupled to the electronic lock module, powered by the battery and mounted with the door.

24 Claims, 18 Drawing Sheets

(56) References Cited

U.S. PATENT DOCUMENTS

| | | | |
|---|---|---|---|
| 8,551,163 | B2 | 10/2013 | Aber et al. |
| 8,638,062 | B2 | 1/2014 | Baarman et al. |
| 8,686,598 | B2 | 4/2014 | Schatz et al. |
| 8,772,970 | B2 | 7/2014 | Lambrou |
| 8,774,714 | B2 | 7/2014 | Metivier |
| 8,805,530 | B2 | 8/2014 | John |
| 8,825,173 | B2 | 9/2014 | Forsell |
| 8,862,241 | B2 | 10/2014 | Forsell |
| 8,901,775 | B2 | 12/2014 | Armstrong et al. |
| 8,907,531 | B2 | 12/2014 | Hall et al. |
| 9,089,717 | B2 | 7/2015 | Forsell |
| 9,132,276 | B2 | 9/2015 | Meskens |
| 9,290,966 | B2 | 3/2016 | Hanchett, Jr. |
| 2004/0183652 | A1 | 9/2004 | Deng et al. |
| 2007/0146115 | A1 | 6/2007 | Roosli et al. |
| 2008/0300658 | A1 | 12/2008 | Meskens |
| 2010/0179384 | A1 | 7/2010 | Hoeg et al. |
| 2011/0050390 | A1* | 3/2011 | Denison ................ B60R 25/102 340/5.51 |
| 2011/0195666 | A1 | 8/2011 | Forsell |
| 2011/0227529 | A1 | 9/2011 | Smith et al. |
| 2011/0311084 | A1 | 12/2011 | Drader |
| 2012/0235502 | A1 | 9/2012 | Kesler et al. |
| 2013/0027177 | A1* | 1/2013 | Denison ............ G07C 9/00571 340/5.23 |
| 2013/0214731 | A1 | 8/2013 | Dinsmoor |
| 2013/0293025 | A1 | 11/2013 | Xu et al. |
| 2013/0307474 | A1 | 11/2013 | Shimura et al. |
| 2014/0136414 | A1 | 5/2014 | Abhyanker |
| 2014/0197692 | A1 | 7/2014 | Chen et al. |
| 2014/0241555 | A1 | 8/2014 | Terlizzi |
| 2014/0260459 | A1 | 9/2014 | Nguyen et al. |
| 2014/0340032 | A1 | 11/2014 | Curtis |
| 2015/0008761 | A1 | 1/2015 | Kesler et al. |
| 2015/0048790 | A1 | 2/2015 | Rudser et al. |
| 2016/0322847 | A1 | 11/2016 | Geiszler |
| 2016/0322855 | A1 | 11/2016 | Geiszler |
| 2017/0018956 | A1 | 1/2017 | Geiszler |
| 2017/0331320 | A1 | 11/2017 | Geiszler |

FOREIGN PATENT DOCUMENTS

| | | | |
|---|---|---|---|
| CN | 102071838 | B | 10/2012 |
| CN | 204103574 | U | 1/2015 |
| DE | 3612761 | A1 | 10/1987 |
| DE | 10206700 | A1 | 8/2003 |
| EP | 2660785 | A2 | 11/2013 |
| WO | 2000077330 | A1 | 12/2000 |
| WO | 2002077399 | A1 | 10/2002 |
| WO | 2005041385 | A2 | 5/2005 |
| WO | 2006006834 | A1 | 1/2006 |
| WO | 2008011657 | A1 | 1/2008 |
| WO | 2016175910 | A1 | 11/2016 |

OTHER PUBLICATIONS

C. Sharpe, Wireless Power Transfer for Access Control Applications, Access & Security, Jul. 17, 2017.

PCT-ISR, PCT/US2016/018471, (Transmittal of the ISR), Jun. 27, 2016.

PCT-IPRP, PCT/US2016/018471, (Transmittal of the IPRP), Nov. 9, 2017.

* cited by examiner

WIRELESSLY CHARGED ELECTRONIC LOCK WITH OPEN/CLOSED STATUS REPORTING

STATEMENT OF RELATED APPLICATIONS

This application is a continuation-in-part, and claims priority to (1) co-pending U.S. patent application Ser. No. 15/639,861 filed Jun. 30, 2017, which is, in turn, a continuation of U.S. patent application Ser. No. 14/699,867 filed Apr. 29, 2015; (2) co-pending U.S. patent application Ser. No. 15/008,159 filed Jan. 27, 2016, which is, in turn, a CIP of Ser. No. 14/699,867; and (3) co-pending U.S. patent application Ser. No. 15/280,534 filed Sep. 29, 2016, which is, in turn, a CIP of Ser. No. 15/008,159 which is, in turn, a CIP of Ser. No. 14/699,867. All of the foregoing applications are commonly assigned by the inventor and are hereby incorporated herein by reference as if set forth fully herein.

TECHNICAL FIELD

The present disclosure relates to systems and methods used to wirelessly recharge a battery, such as a battery that powers a door lock.

BACKGROUND

In the field of wireless electronic systems powered by rechargeable batteries, there exists a need for a system that can recharge a rechargeable battery wirelessly, particularly in connection with wireless electronic door locking systems. Typical existing electronic door locks are powered by non-rechargeable and relatively bulky battery packs. Such non-rechargeable battery packs need to be replaced periodically (typically annually) which requires costly labor, new batteries and disposal of the old batteries. In large facilities with many electronic door locks the costs can be significant. Installation of such locks can require special core drilling of the door and/or electronic transfer hinges to bring power and door control signals to the lock.

OVERVIEW

The subject matter described herein generally relates to apparatus, systems, methods and associated computer instructions for implementing a wirelessly charged battery powered electronic door locking system.

The foregoing overview is a summary and thus may contain simplifications, generalizations, and omissions of detail; consequently, those skilled in the art will appreciate that the overview is illustrative only and is not intended to be in any way limiting.

BRIEF DESCRIPTION OF THE DRAWINGS

The accompanying drawings, which are incorporated into and constitute a part of this specification, illustrate one or more exemplary embodiments and, together with the description of the exemplary embodiments, serve to explain the principles and implementations of the invention. Non-limiting and non-exhaustive embodiments of the present disclosure are described with reference to these drawings, wherein like reference numerals refer to like parts throughout the various figures unless otherwise specified.

In the drawings.

DETAILED DESCRIPTION OF EXAMPLE EMBODIMENTS

Figure 1:
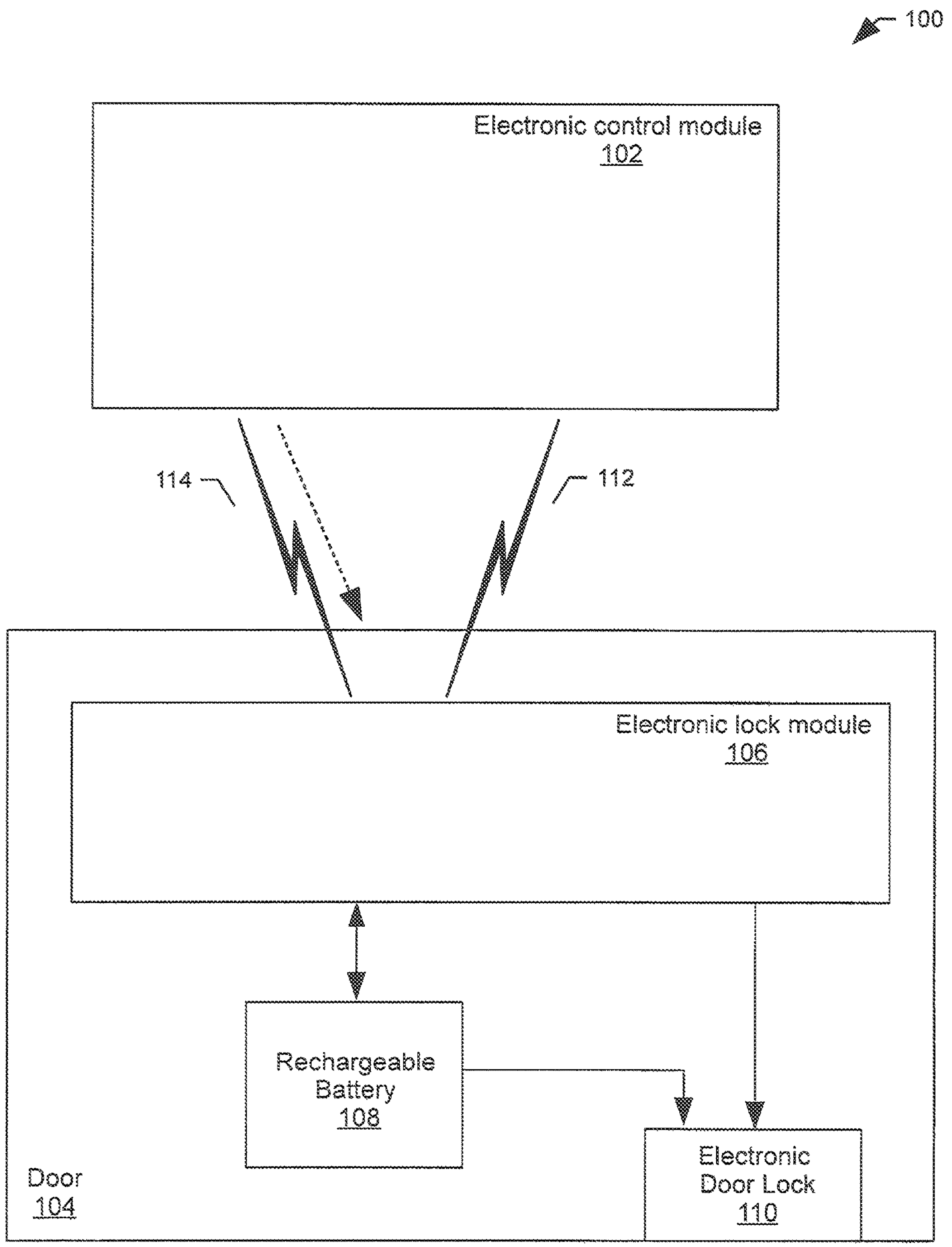
FIG. 1 is a block diagram illustrating an embodiment of a wireless battery charging system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, and the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, a magnetic storage device and the like. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow, block, circuit and physical diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein disclose an apparatus and methods that are configured to wirelessly recharge a rechargeable battery that is associated with, and powers, an electronic door locking system. The system includes an electronic lock module attached to a door. The electronic lock module is electrically coupled to a rechargeable battery, which powers both the electronic lock module and an electronic door lock associated with the door. In an embodiment the electronic lock module, battery and lock may be integrated into one or several packages. In an embodiment, an electronic control module is physically coupled (attached) to a door frame corresponding to the door. The electronic control module receives periodic input data from the electronic lock module, wherein the input data includes the status of the charge on the rechargeable battery. The electronic control module processes the data received from the electronic lock module and determines whether the charge on the rechargeable battery has fallen below a threshold value, wherein the threshold value is either a predetermined threshold value, or the threshold value is dynamically computed based on a plurality of variables that include but are not limited to the age of the battery, the temperature of the battery, the ambient temperature and the use rate. If the electronic control module determines that the charge on the rechargeable battery has fallen below the threshold value, the electronic control module wirelessly transmits a charging signal to the electronic lock module. The electronic lock module wirelessly receives this charging signal and uses this charging signal to charge the rechargeable battery, thereby eliminating the need for periodic inspection or maintenance of the door lock in order to replace or otherwise service non-rechargeable batteries of a disposable battery pack. Charging may be continuous or on demand.

FIG. 1 is a block diagram illustrating an embodiment of a wireless battery charging system 100. In this embodiment, the system is comprised of an electronic lock module 106 attached to a door 104. An electronic control module 102 is located in proximity to the electronic lock module 106, but is physically separate from the electronic lock module 106 and physically separate from the door 104. In some embodiments, the electronic control module 102 is attached to the door frame corresponding to the door 104. In other embodiments, the electronic control module 102 can be attached to a wall adjacent to the door frame corresponding to the door 104. The electronic control module 102 can be located anywhere, as long as the electronic control module 102 and the electronic lock module 106 are able to establish a bidirectional data communications link 112 and a wireless charging link 114. The bidirectional data communications link 112 allows bidirectional exchange of data between the electronic control module 102 and the electronic lock module 106. The data transmitted over the bidirectional data communications link 112 includes, but is not limited to, the status of the charge on a rechargeable battery 108 as transmitted over the bidirectional data communications link 112 by the electronic lock module 106 to the electronic control module 102. Some other functions which may be supported in various embodiments may include a Request-To-Exit command, Lock Status (e.g., locked or unlocked), and a supervisory/status signal to verify that communications with the electronic lock module are working. In some embodiments, the data transmitted over the bidirectional data communications link 112 is encrypted by using an encryption method such as the Advanced Encryption Standard (AES). Other encryption methods may also be used to encrypt the data transmitted over the bidirectional data communications link 112. In other embodiments, the wireless charging link 114 is a unidirectional wireless link that wirelessly transmits a charging signal used to recharge rechargeable battery 108. The wireless charging link 114 wirelessly transmits the charging signal from the electronic control module 102 to the electronic lock module 106. Example methods used to implement the bidirectional data communications link 112 and the wireless charging link 114 include radio frequency (RF), inductive coupling, magnetic coupling and infrared (IR) or any combination of these. Examples of RF wireless communication links include Bluetooth, Bluetooth Low Energy, ZigBee or any other wireless bidirectional RF data communications link. Examples of inductive coupling links (sometimes referred to herein as antennas or coils) include wire-wound solenoids and air-wound coils. Examples of IR wireless communication links include optical communication links implemented by using infrared diodes and infrared laser diodes. In some embodiments, the wireless charging link 114 is also used to communicate unidirectional data as well, from the electronic control module 102 to the electronic lock module 106, in which case the bidirectional data communications link 112 now transmits unidirectional data, from the electronic lock module 106 to the electronic control module 102. The rechargeable battery 108 is attached to the door 104 and is used to power an electronic door lock 110. In some embodiments, the rechargeable battery 108 is used to power the electronic lock module 106, while the electronic control module 102 is powered by a source independent of the rechargeable battery 108.

During operation of an embodiment of system 100, the electronic lock module 106 periodically monitors the charge status on the rechargeable battery 108. The electronic lock module 106 periodically transmits the charge status on the rechargeable battery 108 to the electronic control module 102 via the bidirectional data communications link 112. The electronic control module 102 receives the periodic updates on the charge status on the rechargeable battery 108 from the electronic lock module 106 via the bidirectional data communications link 112. The electronic control module 102 identifies the charge status on the rechargeable battery 108 and compares the value of the charge on the rechargeable battery 108 to a threshold value. In one embodiment, the threshold value is 85% of the charge on the fully-charged battery. If the value of the charge on the rechargeable battery 108 has dropped below the threshold value, the electronic control module 102 determines that the battery needs to be recharged. If the battery needs to be charged, the electronic control module 102 wirelessly transmits a charging signal to the electronic lock module 106 via the wireless charging link 114. This embodiment thus implements a non-continuous charging method, wherein the charging signal is not transmitted wirelessly all the time, but is transmitted non-continuously based on the charge status of the rechargeable battery 108.

During the operation of another embodiment of system 100, the electronic control module 102 continuously transmits wirelessly a charging signal to the electronic lock module 106 via the wireless charging link 114, regardless of the status of the charge on the rechargeable battery 108. This embodiment thus implements a continuous charging method, wherein the charging signal is transmitted wirelessly all the time.

Figure 2A:
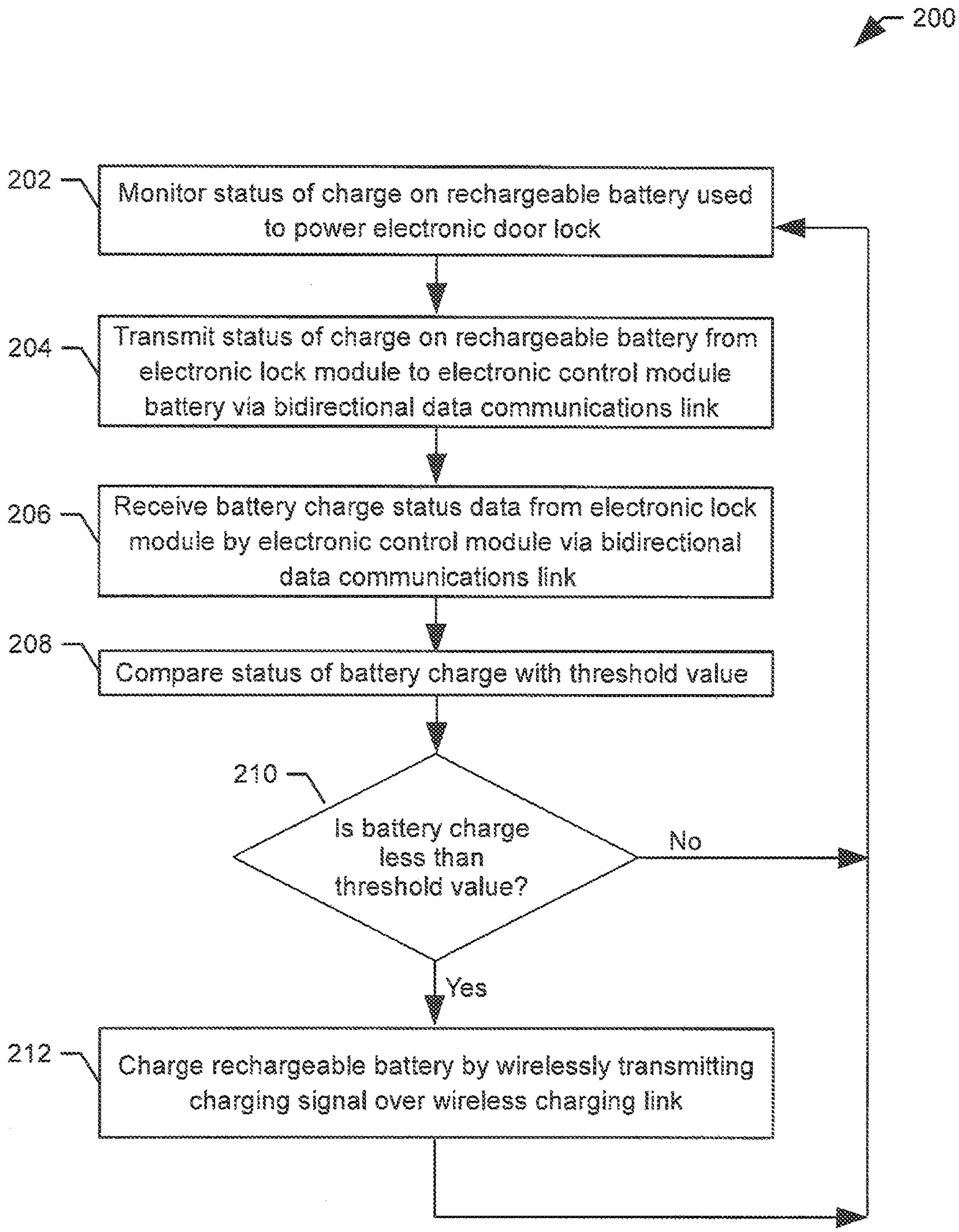
FIG. 2A is a process flow diagram illustrating an embodiment of a method for monitoring the status of a rechargeable battery and wirelessly recharging the rechargeable battery when necessary via the wireless charging link.

FIG. 2A is a process flow diagram illustrating an embodiment of a method 200 for monitoring the status of rechargeable battery 108 and wirelessly recharging the rechargeable battery when necessary via the wireless charging link 114. The method 200 is a non-continuous charging method. At 202, the method 200 monitors the status of the charge on the rechargeable battery 108 used to power the electronic door lock 110. The status of the charge on the rechargeable battery 108 is monitored by the electronic lock module 106. Next, at 204, the electronic lock module 106 transmits the status of the charge on the rechargeable battery 108 via the bidirectional data communications link 112 to the electronic control module 102. At 206, the electronic control module 102 receives the status of the charge on the rechargeable battery 108 transmitted by the electronic lock module 106 via the bidirectional data communications link 112.

At 208, the electronic control module compares the status of the charge on the rechargeable battery 108 to a threshold value. If the charge on the rechargeable battery 108 is greater than or equal to the threshold value (as determined at 210), the method 200 returns back to 202 since no recharging is required for the rechargeable battery 108. If the charge on the rechargeable battery 108 is less than the threshold value, the method 200 charges the rechargeable battery at 212 by wirelessly transmitting a charging signal over the wireless charging link 114, after which the method 200 returns to initial step 202.

Figure 2B:
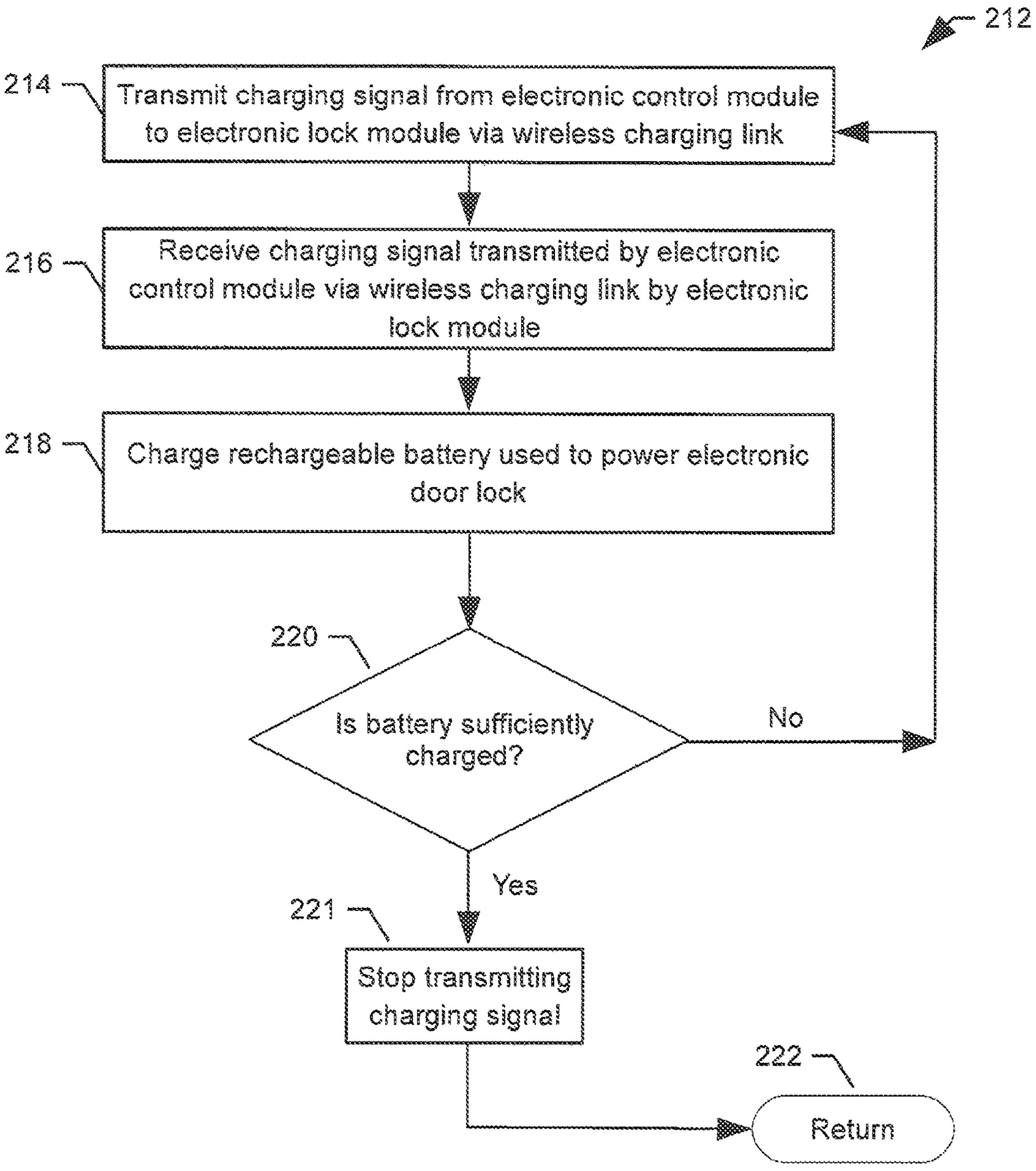
FIG. 2B is a process flow diagram illustrating an embodiment showing details of a method for wirelessly charging the rechargeable battery via the wireless charging link.

FIG. 2B is a process flow diagram illustrating an embodiment showing details of a method for wirelessly charging the rechargeable battery (shown as 212 in FIG. 2*a*) 108 via the wireless charging link 114. At 214, the electronic control module 102 wirelessly transmits a charging signal to the electronic lock module 106 via the wireless charging link 114. At 216, the electronic lock module 106 wirelessly receives the charging signal transmitted by the electronic control module 102 via the wireless charging link 114. At 218, the electronic lock module 106 charges the rechargeable battery 108 used to power the electronic door lock 110, where the electronic control module 102 continuously transmits the charging signal to the electronic lock module 106 via the wireless charging link 114. At 220, the method 212 checks if the rechargeable battery 108 is sufficiently charged, wherein the term "sufficiently charged" is used to denote that the rechargeable battery 108 is charged to a value that is around 100% capacity, where this value can be less than 100% capacity. Sufficiently charging the rechargeable battery 108 can include, for example, charging the rechargeable battery 108 up to 95% capacity, and includes cases where, for example, the rechargeable battery 108 is not able to charge up to a 100% charge capacity due to aging. If the rechargeable battery 108 is not sufficiently charged, then the method 212 returns back to 214. If the rechargeable battery 108 is sufficiently charged, then the method 212 stops transmitting the charging signal at 221 and continues to 222, where it returns to 202.

Figure 2C:
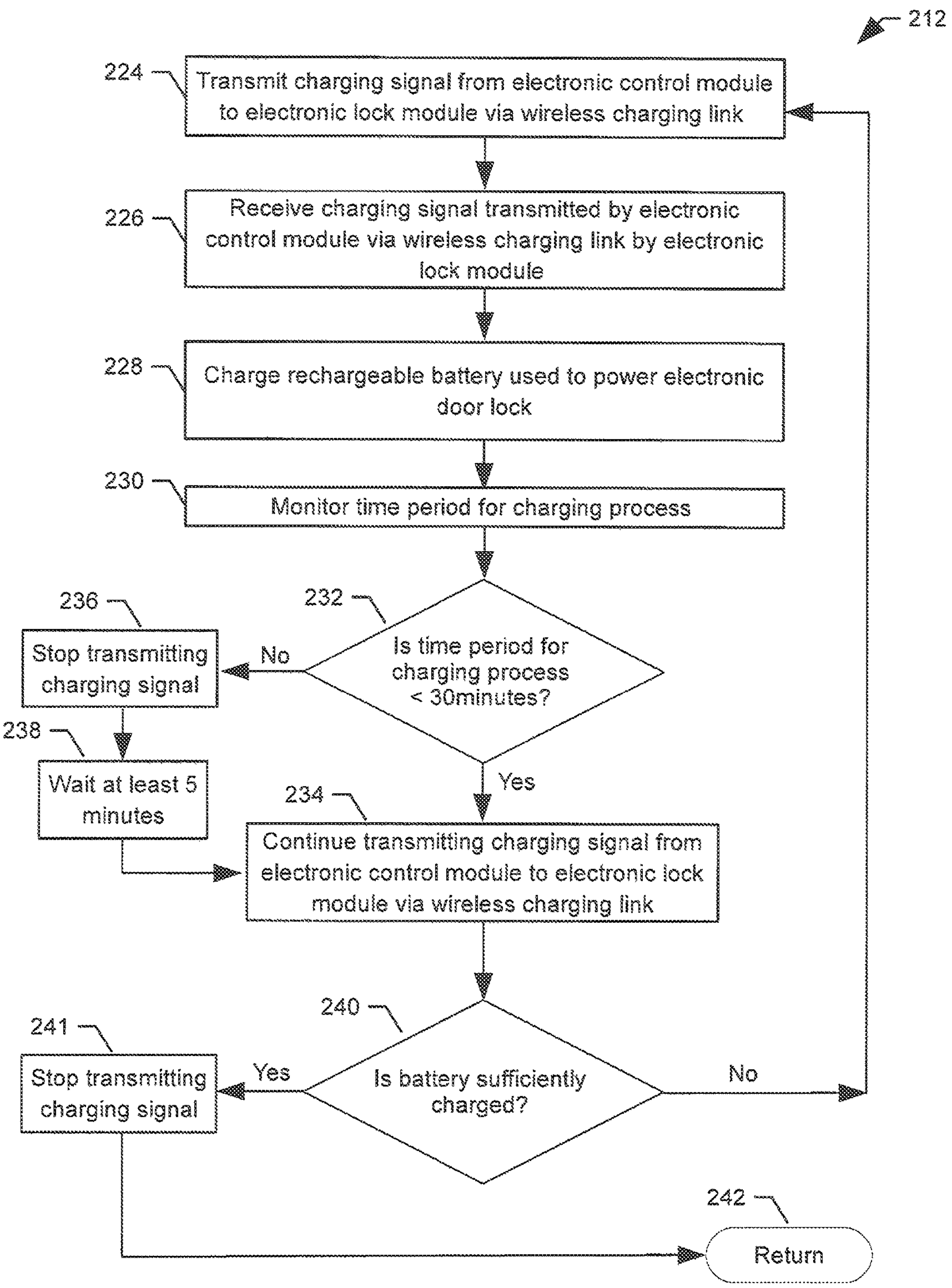
FIG. 2C is a process flow diagram illustrating an alternate embodiment showing details of a method for wirelessly charging the rechargeable battery via the wireless charging link.

FIG. 2C is a flow diagram illustrating an alternate embodiment showing details of a method for wirelessly charging the rechargeable battery (shown as 212 in FIG. 2*a*) 108 via the wireless charging link 114. At 224, the electronic control module 102 wirelessly transmits a charging signal to the electronic lock module 106 via the wireless charging link 114. At 226, the electronic lock module 106 wirelessly receives the charging signal transmitted by the electronic control module 102 via the wireless charging link 114. At 228, the electronic lock module 106 charges the rechargeable battery 108 used to power the electronic door lock 110. At 230, the method monitors the time period for the charging process. At 232, the method 212 also checks if the time period for the charging process is less than 30 minutes. Alternate embodiments may use time periods shorter or longer than 30 minutes. If the time period for the charging process is less than 30 minutes, then the method 212 proceeds to 234; if the time period for the charging process is greater than 30 minutes, then the method stops transmitting the charging signal at 236 and waits for at least 5 minutes, at 238, before proceeding to 234 where the electronic control module 102 continues transmitting the charging signal to the electronic lock module 106 via the wireless charging link 114. At the next step 240, the method 212 checks if the rechargeable battery 108 is sufficiently charged, where the term "sufficiently charged" is used to denote that the rechargeable battery 108 is charged to a value that is around 100% capacity, and this value can be less than 100% capacity. Sufficiently charging the rechargeable battery 108 can include, for example, charging the rechargeable battery 108 up to 95% capacity, and includes cases where, for example, the rechargeable battery 108 is not able to charge up to a 100% charge capacity due to aging. If the rechargeable battery 108 is not sufficiently charged, then the method returns back to 224. If the rechargeable battery 108 is sufficiently charged, then the method stops transmitting the charging signal at 241 and goes to 242, where it returns to 202.

Figure 3:
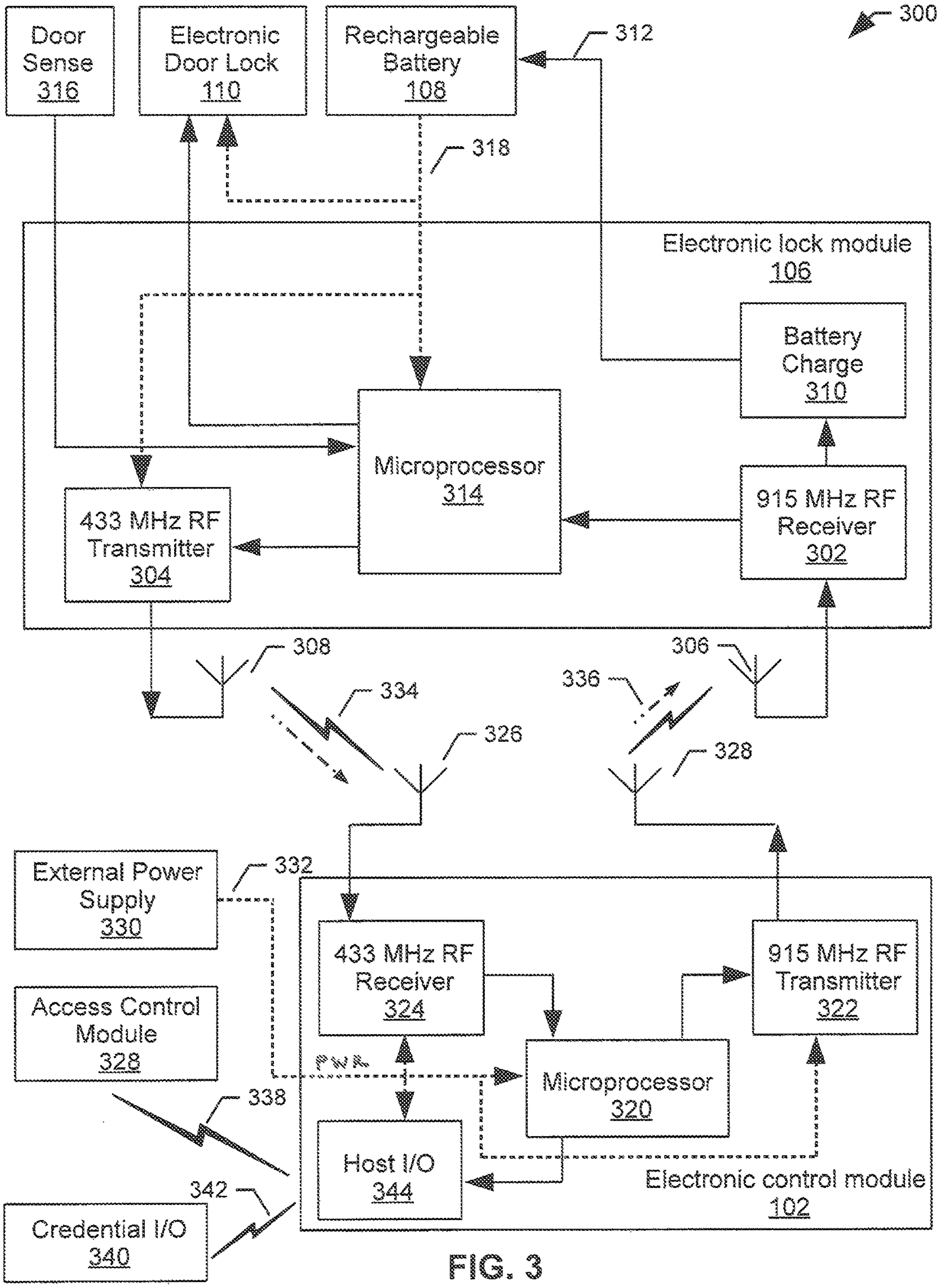
FIG. 3 is a block diagram illustrating an embodiment of a wireless battery charging system.

FIG. 3 is a block diagram illustrating an embodiment of a wireless battery charging system 300. This embodiment shows the electronic control module 102 and the electronic lock module 106 discussed above. Also shown are the rechargeable battery 108 and the electronic door lock 110. In one embodiment, the electronic lock module 106 includes a microprocessor 314, a 433 MHz RF transmitter 304, a 915 MHz RF receiver 302, and a battery charge module 310. In one embodiment, the rechargeable battery 108 supplies power to the electronic door lock 110, the microprocessor 314, and the 433 MHz transmitter 304, via the electronic lock module power supply bus 318. The 433 MHz RF transmitter 304 receives a signal from microprocessor 314, and outputs an RF signal at a frequency of 433 MHz. This RF signal is output to an RF antenna 308 for transmission through a unidirectional RF data communications link 334. The 915 MHz RF receiver 302 is powered by the wireless RF signal received by an RF antenna 306 over a unidirectional RF data communications link 336.

In one embodiment, the electronic control module 102 includes a microprocessor 320, a 915 MHz RF transmitter 322, a 433 MHz RF receiver 324 and host I/O 344. In this embodiment, the microprocessor 320, the 915 MHz RF transmitter 322, the 433 MHz RF receiver 324 and the host I/O 344 are powered from an external power supply 330 via an electronic control module power supply bus 332. The 915 MHz RF transmitter 322 receives a signal from microprocessor 320, and outputs an RF signal at a frequency of 915 MHz. This RF signal is output to RF antenna 328 for transmission through the unidirectional RF data communications link 336. The 433 MHz RF receiver 324 is receives an RF signal via the RF antenna 326 over the unidirectional RF data communications link 334 and outputs this signal to the microprocessor 320.

The two unidirectional wireless RF data communications links 334 and 336 collectively constitute the bidirectional data link 112. In this embodiment, the bidirectional data link is a wireless RF data link. Furthermore, the wireless charging link 114 is implemented by the unidirectional RF data communications link 336. Thus, the unidirectional RF data communications link 336 wirelessly transmits both data and the charging signal from the electronic control module 102 to the electronic lock module 106.

In one embodiment, the microprocessor 314 in the electronic lock module 106 periodically monitors the status of the charge on the rechargeable battery 108. The microprocessor 314 transmits this status of the charge on the rechargeable battery 108 as a data signal to the 433 MHz RF transmitter 304, which outputs this data signal to the RF antenna 308 that is electrically coupled to the 433 MHz RF transmitter 304. The RF antenna 308 transmits the data signal comprising the status of the rechargeable battery 108 over the unidirectional RF data communications link 334. This data signal is received by the RF antenna 326 electrically coupled to the 433 MHz RF receiver 324 that is a part of the electronic control module 102. The data signal received by the 433 MHz RF receiver 324 is transmitted to the microprocessor 320. The microprocessor 320 compares the received data signal, which is the status of the charge on the rechargeable battery, with a threshold value. If the status of the charge on the rechargeable battery is less than the threshold value, the microprocessor 320 transmits a charging signal to the 915 MHz RF transmitter 322. The 915 MHz RF transmitter 322 transmits this charging signal to RF antenna 328 which is electrically coupled to the 915 MHz RF transmitter 322. The RF antenna 328 wirelessly transmits the charging signal over the unidirectional RF data communications link 336. The charging signal is wirelessly received by the RF antenna 306 which is electrically coupled to the 915 MHz RF receiver 302. The RF antenna 306 wirelessly transmits the received charging signal to the 915 MHz RF receiver 302. The charging signal is used to power the 915 MHz RF receiver 302 and the battery charge module 310, and the charging signal is also transmitted to the battery charge module 310, which transmits the charging signal to charge the rechargeable battery 108 via a charging path 312. This embodiment implements the non-continuous charging method. In this embodiment, data from the electronic control module 102 is wirelessly transmitted to the electronic lock module 106 via the unidirectional RF data communications link 336 in a non-continuous manner, along with the wirelessly transmitted charging signal.

In another embodiment, the microprocessor 320 continuously transmits a charging signal to the 915 MHz RF transmitter 322 regardless of the status of the status of the charge on the rechargeable battery 108. The 915 MHz RF transmitter 322 transmits this charging signal to RF antenna 328 which is electrically coupled to the 915 MHz RF transmitter 322. The RF antenna 328 wirelessly transmits the charging signal over the unidirectional RF data communications link 336. The charging signal is wirelessly received by the RF antenna 306 which is electrically coupled to the 915 MHz RF receiver 302. The RF antenna 306 wirelessly transmits the received charging signal to the 915 MHz RF receiver 302. The charging signal is used to power the 915 MHz RF receiver 302 and the battery charge module 310, and the charging signal is also transmitted to the battery charge module 310, which transmits the charging signal to charge the rechargeable battery 108 via charging path 312. This embodiment implements the continuous charging method. In this embodiment, data from the electronic control module 102 can be wirelessly transmitted to the electronic lock module 106 via the unidirectional RF data communications link 336 in a continuous manner, along with the wirelessly transmitted charging signal.

In some embodiments, a door sense module 316 monitors a status of the door 104, such as door open, door ajar, door shut and latch/bolt position sense. The door sense module 316 periodically transmits a door status data signal to the microprocessor 314. This door status data signal is transmitted by the microprocessor 314 to the 433 MHz RF transmitter 304, which then transmits this door status data signal to RF antenna 308 that is electrically coupled to the 433 MHz RF transmitter 304. The door status data signal is transmitted by the RF antenna 308 over the unidirectional RF data communications link 334. The door status data signal is received by RF antenna 326 that is electrically coupled to the 433 MHz RF receiver 324. RF antenna 326 transmits the received door status data signal to the 433 MHz RF receiver 324, which then transmits the door status data signal to microprocessor 320 for subsequent processing (e.g., to determine if the door is open or closed based on the magnitude and/or behavior or the signal received).

In other embodiments, the electronic lock module 106 periodically transmits a data signal to the electronic control module 102 via the unidirectional RF data communications link 334. The contents of this data signal include the charge status on the rechargeable battery 108 and the status of the door. This periodically transmitted data signal may be referred to as a heartbeat signal. In other embodiments, the monitoring of the door status is performed by the electronic control module 102.

Electronic control module 102 is also electrically coupled via an electrical coupling 342 to credential I/O module 340. The credential I/O module 340 reads an input from a user for authentication purposes. User input methods include, for example, magnetic cards, biometric devices, RFID cards, keypads, and smart devices such as smartphones and PDAs that use communication protocols such as Near Field Communication (NFC). The credential I/O module 340 transmits user input to the electronic control module 102 for authentication. The credential I/O module 340 also receives input from the electronic control module 102 via the electrical coupling 342, including user feedback that includes, but is not limited to, audio-visual signals either confirming or denying permission to enter.

In some embodiments, the credential I/O module 340 is physically attached to the door 104 and electrically coupled to the electronic lock module 106. In this embodiment, the credential I/O module 340, powered by rechargeable battery 108, reads an input from a user for authentication purposes. The credential I/O module 340 transmits user input to the electronic control module 102 for authentication via the unidirectional RF data communications link 334. The credential I/O module 340 also receives input from the electronic control module 102 via the unidirectional RF data communications link 336, including user feedback that includes, but is not limited to, audio-visual signals either confirming or denying permission to enter.

Electronic control module 102 is also electrically coupled via an electrical coupling 338 to the access control module 328 via the host I/O 344. The interface between the host I/O 344 and the access control module 328 is used for purposes such as user authentication, discussed in greater detail in the description of FIG. 4. In some embodiments, the electrical coupling 338 between the host I/O 344 and the access control module 328 is realized by standard connectivity methods that include, but are not limited to, Ethernet, Wi-Fi, RS485, RS422, RS232, or other wired or wireless communication methods.

In some embodiments, RF antennas 306, 308, 326 and 328 are functions of the physical separation between the electronic control module 102 and the electronic lock module 106. In one embodiment, antennas 308 and 326 are traces on a printed circuit board not to exceed 1.5 inches in length. In another embodiment, antennas 306 and 328 are 3.2 inches, or less, in length, and 0.6 inches in width.

Figure 4:
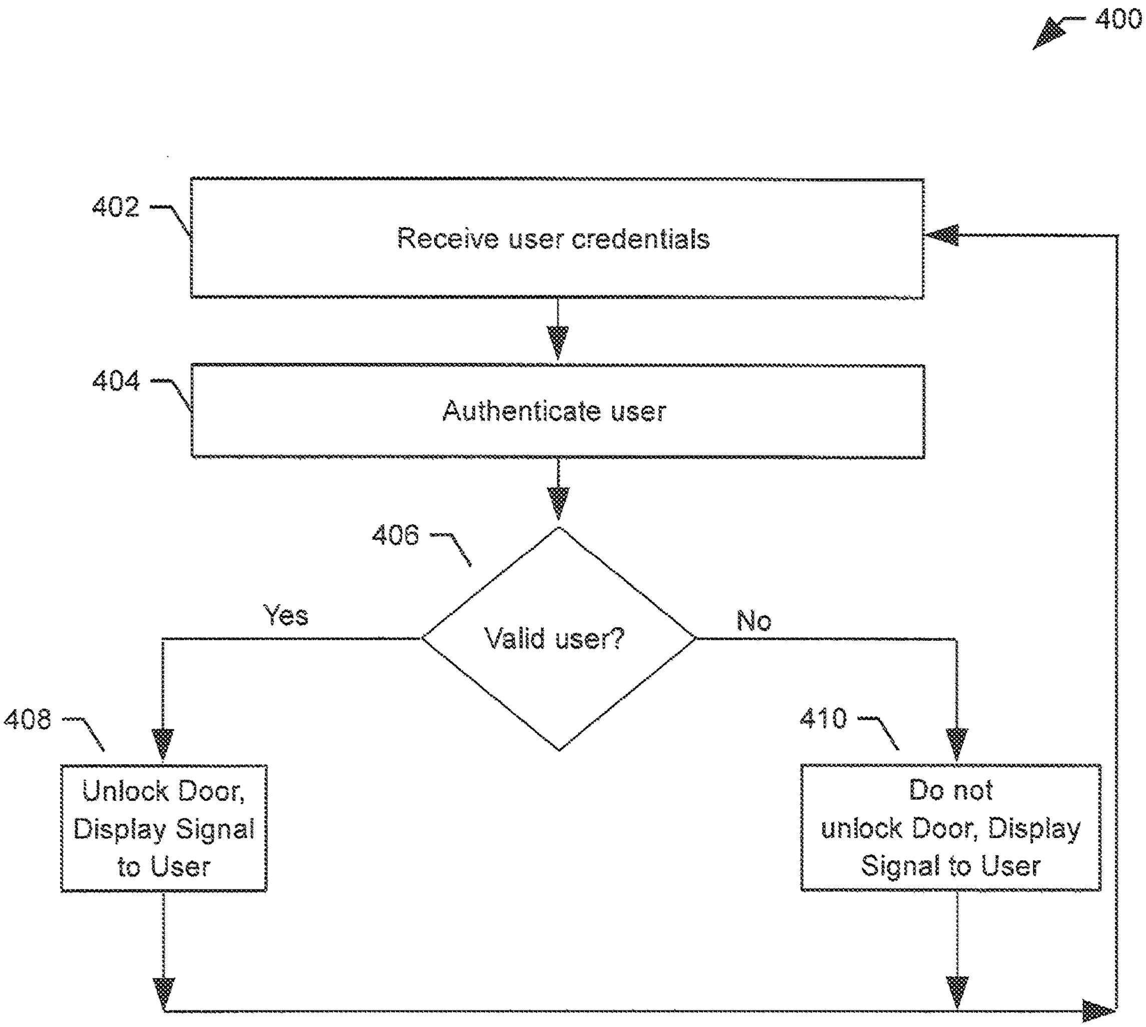
FIG. 4 is a process flow diagram illustrating an embodiment of a method for authenticating a user to determine whether to unlock the door.

FIG. 4 is a process flow diagram illustrating an embodiment of a method 400 for authenticating a user to determine whether to unlock the door. In some embodiments, the electronic door lock 110 is locked by default. The method 400 receives user credentials at 402. In some embodiments, user credentials are received by the electronic control module 102 from the credential I/O module 340, via the electrical coupling 342. The host I/O 344 transmits the user credentials to the access control module 328 via electrical coupling 338 in order to authenticate the user at 404. The access control module 328 processes the user credentials and determines the authenticity of the user at 406. The access control module 328 transmits the decision on user authenticity back to the host I/O 344. In some embodiments, the access control module comprises a numeric keypad that is used by a user to enter credential information. If the user is not a valid user, then the method 400 transmits a user appropriate feedback signal to the user and the door 104 is not unlocked, at 410. The user feedback signal is transmitted from the electronic control module 102 to the credential I/O module 340 via the electrical coupling 342. The credential I/O module 340 displays the appropriate feedback to the user via methods that include audio and visual feedback. If the authentication 406 determines that the user is a valid user, then the method 400 transmits an appropriate feedback signal to the user and the door 104 is unlocked, at 408. In some embodiments, the decision to unlock the door 104 by the access control module 328 is made based on other criteria in addition to the user credentials, wherein the criteria may include but are not limited to the time-of-day, whether the day that access is requested is a weekend or a holiday, whether the building is in lockdown mode, the maximum number of people allowed in a room or within the building, and so on.

The user feedback signal is transmitted from the electronic control module 102 to the credential I/O module 340 via the electrical coupling 342. The credential I/O module 340 displays the appropriate feedback to the user via methods that include audio and visual feedback. The door unlock process involves the control module 102 sending a door unlock command data signal to the electronic lock module 106 via the unidirectional RF data communications link 336. In order to achieve this, the microprocessor 320 sends the door unlock command data signal to the 915 MHz RF transmitter 322, which then transmits the door unlock command data signal over the unidirectional RF data communications link 336 via RF antenna 328. The electronic lock module 106 receives the door unlock command data signal. This is achieved by the RF antenna 306 receiving the door unlock command data signal over the unidirectional RF data communications link 336. The RF antenna 306 then transmits the received door unlock command data signal to the 915 MHz RF receiver 302, which transmits this door unlock command data signal to the microprocessor 314 which issues a command to the electronic lock to unlock the door 104. The method 400 then returns to 402 and the process repeats.

Figure 5:
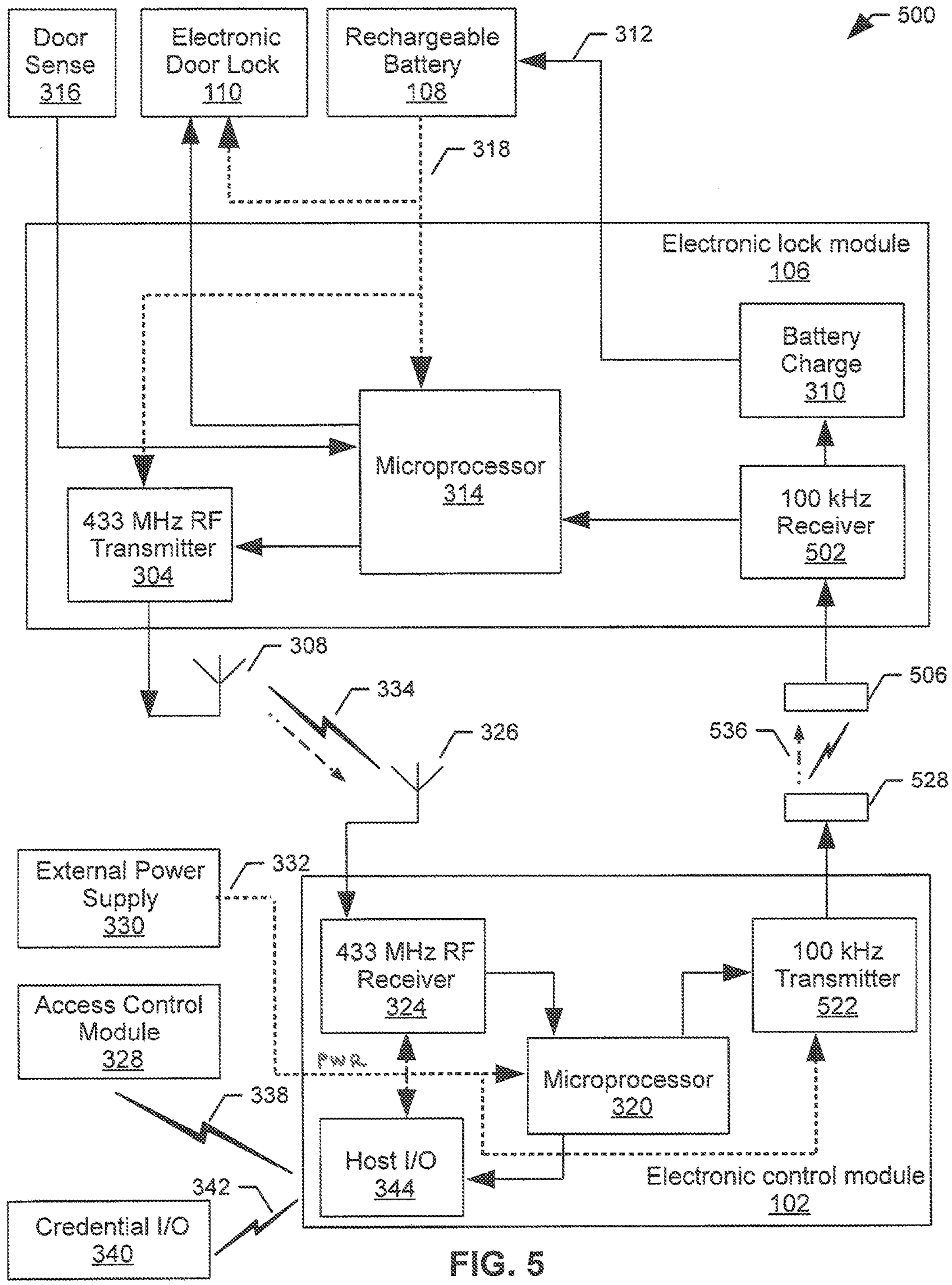
FIG. 5 is a block diagram illustrating another embodiment of a wireless battery charging system.

FIG. 5 is a block diagram illustrating another embodiment of a wireless battery charging system 500. Many of the components shown in FIG. 5 are similar to the components shown in FIG. 3 and, therefore, are identified with the same reference numbers. This embodiment shows the electronic control module 102 and the electronic lock module 106. Also shown are the rechargeable battery 108 and the electronic door lock 110. In one embodiment, the electronic lock module 106 includes the microprocessor 314, the 433 MHz RF transmitter 304, a 100 kHz receiver 502, and the battery charge module 310. In one embodiment, the rechargeable battery 108 supplies power to the electronic door lock 110, the microprocessor 314, and the 433 MHz transmitter 304, via the electronic lock module power supply bus 318. The 433 MHz RF transmitter 304 receives a signal from microprocessor 314, and outputs an RF signal at a frequency of 433 MHz. This RF signal is output to RF antenna 308 for transmission through the unidirectional RF data communications link 334. The 100 kHz receiver 502 is powered by a wireless signal received by a solenoid 506 over a unidirectional inductively coupled wireless communications link 536. In other embodiments, the unidirectional link 536 may be comprised of a magnetically coupled link. The unidirectional inductively coupled wireless communications link 536 is configured to wirelessly transmit both data and a charging signal that is used to recharge the rechargeable battery 108.

In one embodiment, the electronic control module 102 includes microprocessor 320, a 100 kHz transmitter 522, the 433 MHz RF receiver 324 and host I/O 344. In this embodiment, the microprocessor 320, the 100 kHz transmitter 522, the 433 MHz RF receiver 324 and the host I/O 344 are powered from external power supply 330 via the electronic control module power supply bus 332. The 100 kHz transmitter 522 receives a signal from microprocessor 320, and outputs a signal at a frequency of 100 kHz. This 100 kHz signal is output to solenoid 528 for transmission over the unidirectional inductively coupled wireless communications link 536. The 433 MHz RF receiver 324 receives an RF signal via the RF antenna 326 over the unidirectional RF data communications link 334 and outputs this signal to the microprocessor 320.

In this embodiment, the unidirectional wireless RF data communications link 334 and the unidirectional inductively coupled wireless communications link 536 collectively constitute the bidirectional data link 112. Furthermore, the wireless charging link 114 is implemented by the unidirectional inductively coupled wireless communications link 536. Thus, the unidirectional inductively coupled wireless communications link 536 wirelessly transmits both data and the charging signal from the electronic control module 102 to the electronic lock module 106.

In one embodiment, the microprocessor 314 in the electronic lock module 106 periodically monitors the status of the charge on the rechargeable battery 108. The microprocessor 314 transmits this status of the charge on the rechargeable battery 108 as a data signal to the 433 MHz RF transmitter 304, which outputs this data signal to the RF antenna 308 that is electrically coupled to the 433 MHz RF transmitter 304. The RF antenna 308 transmits the data signal comprising the status of the rechargeable battery 108 over the unidirectional RF data communications link 334. This data signal is received by the RF antenna 326 electrically coupled to the 433 MHz RF receiver 324 that is a part of the electronic control module 102. The data signal received by the 433 MHz RF receiver 324 is transmitted to the microprocessor 320. The microprocessor 320 compares the received data signal, which is the status of the charge on the rechargeable battery, with a threshold value. If the status of the charge on the rechargeable battery is less than the threshold value, the microprocessor 320 transmits a charging signal to the 100 kHz transmitter 522. The 100 kHz transmitter 522 transmits this charging signal to solenoid 528 which is electrically coupled to the 100 kHz transmitter 522. The solenoid 528 wirelessly transmits the charging signal over the unidirectional inductively coupled wireless communications link 536. The charging signal is wirelessly received by the solenoid 506 which is electrically coupled to the 100 kHz receiver 502. The solenoid 506 transmits the received charging signal to the 100 kHz receiver 302. The charging signal is used to power the 100 kHz receiver 502 and the battery charge module 310, and the charging signal is also transmitted to the battery charge module 310, which transmits the charging signal to charge the rechargeable battery 108 via charging path 312. This embodiment implements the non-continuous charging method. In this embodiment, data from the electronic control module 102 is wirelessly transmitted to the electronic lock module 106 via the unidirectional inductively coupled wireless communications link 536 in a non-continuous manner, along with the wirelessly transmitted charging signal.

In another embodiment, the microprocessor 320 transmits a charging signal to the 100 kHz transmitter 522 regardless of the status of the charge on the rechargeable battery 108. The 100 kHz transmitter 522 transmits this charging signal to solenoid 528 which is electrically coupled to the 100 kHz transmitter 522. The solenoid 528 wirelessly transmits the charging signal over the unidirectional inductively coupled wireless communications link 536. The charging signal is wirelessly received by the solenoid 506 which is electrically coupled to the 100 kHz receiver 502. The solenoid 506 transmits the received charging signal to the 100 kHz receiver 302. The charging signal is used to power the 100 kHz receiver 502 and the battery charge module 310, and the charging signal is also transmitted to the battery charge module 310, which transmits the charging signal to charge the rechargeable battery 108 via charging path 312. This embodiment implements the continuous charging method. In this embodiment, data from the electronic control module 102 can be wirelessly transmitted to the electronic lock module 106 via the unidirectional inductively coupled wireless communications link 536 in a continuous manner, along with the wirelessly transmitted charging signal.

In some embodiments, both solenoids 528 and 506 and the associated transmitter 522 and receiver 502 are resonant at (i.e., are tuned to) a frequency of 100 kHz. In other embodiments, the resonant frequency may be a frequency different from 100 kHz.

In other embodiments, the door sense module 316 monitors a status of the door 104, such as door open, door ajar, door shut and latch/bolt position sense. The door sense module 316 periodically transmits a door status data signal to the microprocessor 314. This door status data signal is transmitted by the microprocessor 314 to the 433 MHz RF transmitter 304, which then transmits this data signal to RF antenna 308 that is electrically coupled to the 433 MHz RF transmitter 304. The door status data signal is transmitted by the RF antenna 308 over the unidirectional RF data communications link 334. The door status data signal is received by RF antenna 326 that is electrically coupled to the 433 MHz RF receiver 324. RF antenna 326 transmits the received door status data signal to the 433 MHz RF receiver 324, which then transmits the door status data signal to microprocessor 320 for subsequent processing.

In other embodiments, the electronic lock module 106 periodically transmits a data signal to the electronic control module 102 via the unidirectional RF data communications link 334. The contents of this data signal include the charge status on the rechargeable battery 108 and the status of the door. This periodically transmitted data signal may be referred to as a heartbeat signal. In other embodiments, the monitoring of the door status is performed by the electronic control module 102.

Electronic control module 102 is also electrically coupled via an electrical coupling 342 to credential I/O module 340. The credential I/O module 340 reads an input from a user for authentication purposes. User input methods include, for example, magnetic cards, biometrics, keypads, and smart devices such as smartphones and PDAs that use communication protocols such as Near Field Communication (NFC). The credential I/O module 340 transmits user input to the electronic control module 102 for authentication. The credential I/O module 340 also receives input from the electronic control module 102 via the electrical coupling 342, including user feedback that includes, but is not limited to, audio-visual signals either confirming or denying permission to enter.

In some embodiments, the credential I/O module 340 is physically attached to the door 104 and electrically coupled to the electronic lock module 106. In this embodiment, the credential I/O module 340, powered by rechargeable battery 108, reads an input from a user for authentication purposes. The credential I/O module 340 transmits user input to the electronic control module 102 for authentication via the unidirectional RF data communications link 334. The credential I/O module 340 also receives input from the electronic control module 102 via the unidirectional inductively coupled wireless communications link 536, including user feedback that includes, but is not limited to, audio-visual signals either confirming or denying permission to enter.

Electronic control module 102 is also electrically coupled via an electrical coupling 338 to the access control module 328 via the host I/O 344. The interface between the host I/O 344 and the access control module 328 is used for purposes such as user authentication, discussed in greater detail in the description of FIG. 4. In some embodiments, the electrical coupling 338 between the host I/O 344 and the access control module 328 is realized by standard connectivity methods that include, for example, Ethernet or Wi-Fi.

In some embodiments, RF antennas 308 and 326 are functions of the physical separation between the electronic control module 102 and the electronic lock module 106. In one embodiment, antennas 308 and 326 are traces on a printed circuit board not to exceed 1.5 inches in length.

In some embodiments, solenoids 506 and 528 are comprised of ferrite cores. In other embodiments, solenoids 506 and 528 may be replaced by air wound coils. In other embodiments, solenoids 506 and 528 include cores that are comprised of materials with high magnetic permeability. Example dimensions of solenoids include but are not limited to 0.275 inches in diameter and 1.5 inches in length.

In some embodiments, the transmission frequency associated with the unidirectional inductively coupled wireless communications link 536 may be different from 100 kHz, for example the transmission frequency could be 135 kHz, or as high as 400 kHz. In other embodiments, the unidirectional RF data communications link 334 may be replaced by a unidirectional inductively coupled wireless communications link that is similar to the unidirectional inductively coupled wireless communications link 536. This unidirectional inductively coupled wireless communications link may be comprised of solenoids similar to solenoids 506 and 528, and include the corresponding transmitter and receiver similar to 522 and 502 respectively, at the appropriate transmission frequency.

Figure 6:
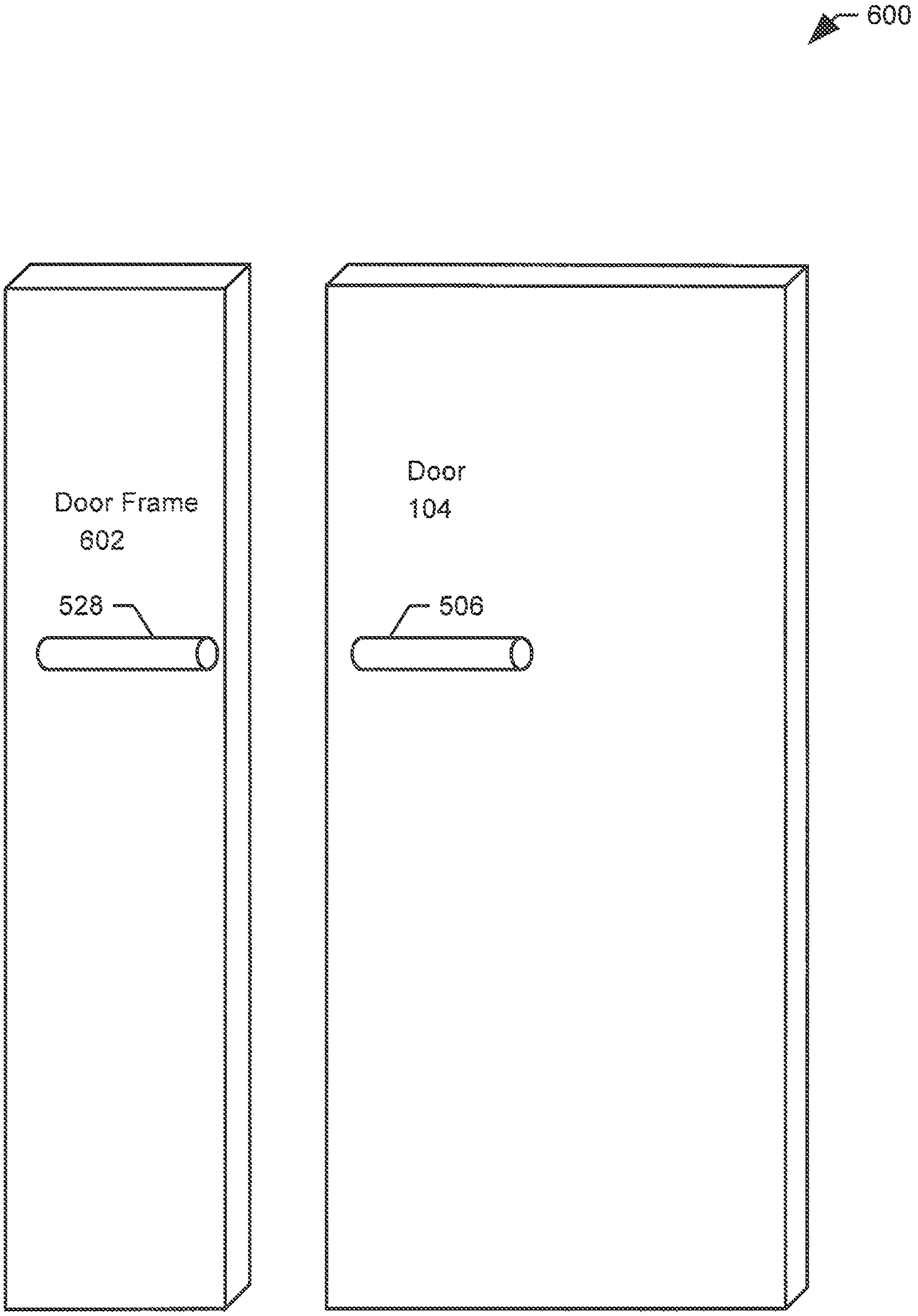
FIG. 6 is a diagram illustrating a physical implementation of certain components of an embodiment of the wireless battery charging system.

FIG. 6 is a diagram illustrating a physical implementation of certain components of an embodiment of the wireless battery charging system 600. This embodiment shows the solenoid 528 associated with the electronic control module 102, wherein the solenoid 528 is mounted on (or mounted within) the door frame 602. The solenoid 506 associated with the electronic lock module 106 is mounted on (or mounted within) the door 104. In this embodiment, the solenoids 506 and 528 are positioned such that they are coaxial. In another embodiment, the solenoids 506 and 528 may not be coaxial. The solenoids 506 and 528 generate the unidirectional inductively coupled wireless communications link 536.

Figure 7:
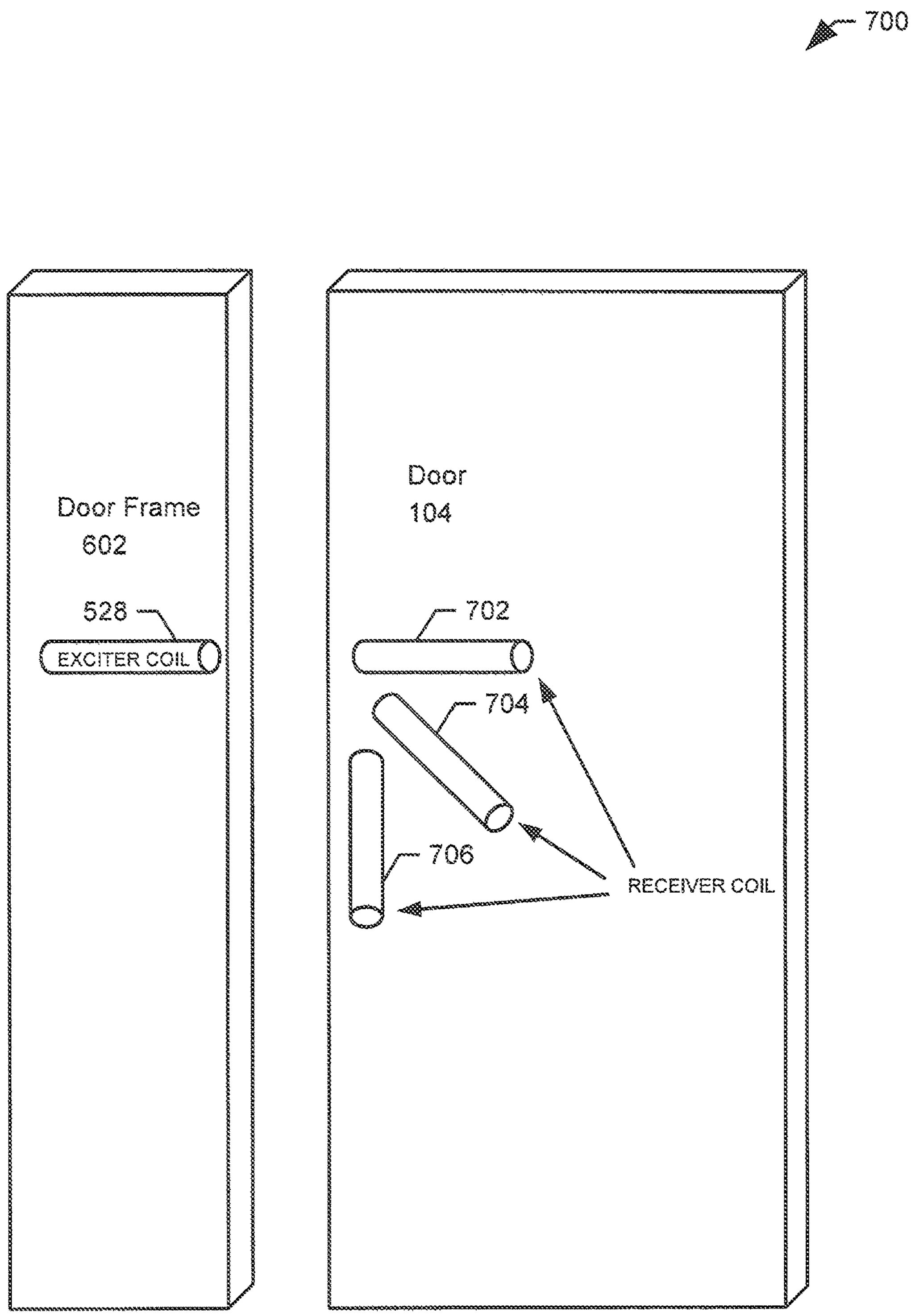
FIG. 7 is diagram illustrating an alternate physical implementation of certain components of an embodiment of the wireless battery charging system.

FIG. 7 is a diagram illustrating a physical implementation of certain components of an embodiment of the wireless battery charging system 700. In this embodiment, the solenoid 528 associated with the electronic control module 102, also referred to as the exciter antenna, is mounted on (or within) the door frame 602. Mounting positions 702, 704 and 706 show some different possible mounting locations in which the solenoid 506 associated with the electronic lock module 106, also referred to as the receiver antenna, is mounted on (or within) the door 104. These mounting positions 702, 704 and 706 are possible because the solenoids 528 and 506 do not have to be coaxial in order to establish the unidirectional inductively coupled wireless communications link 536. In an embodiment, the receiver antenna 506 can be up to 1 inch from the exciter antenna 528, and offset center-to-center by up to 0.5 inches.

Figure 8:
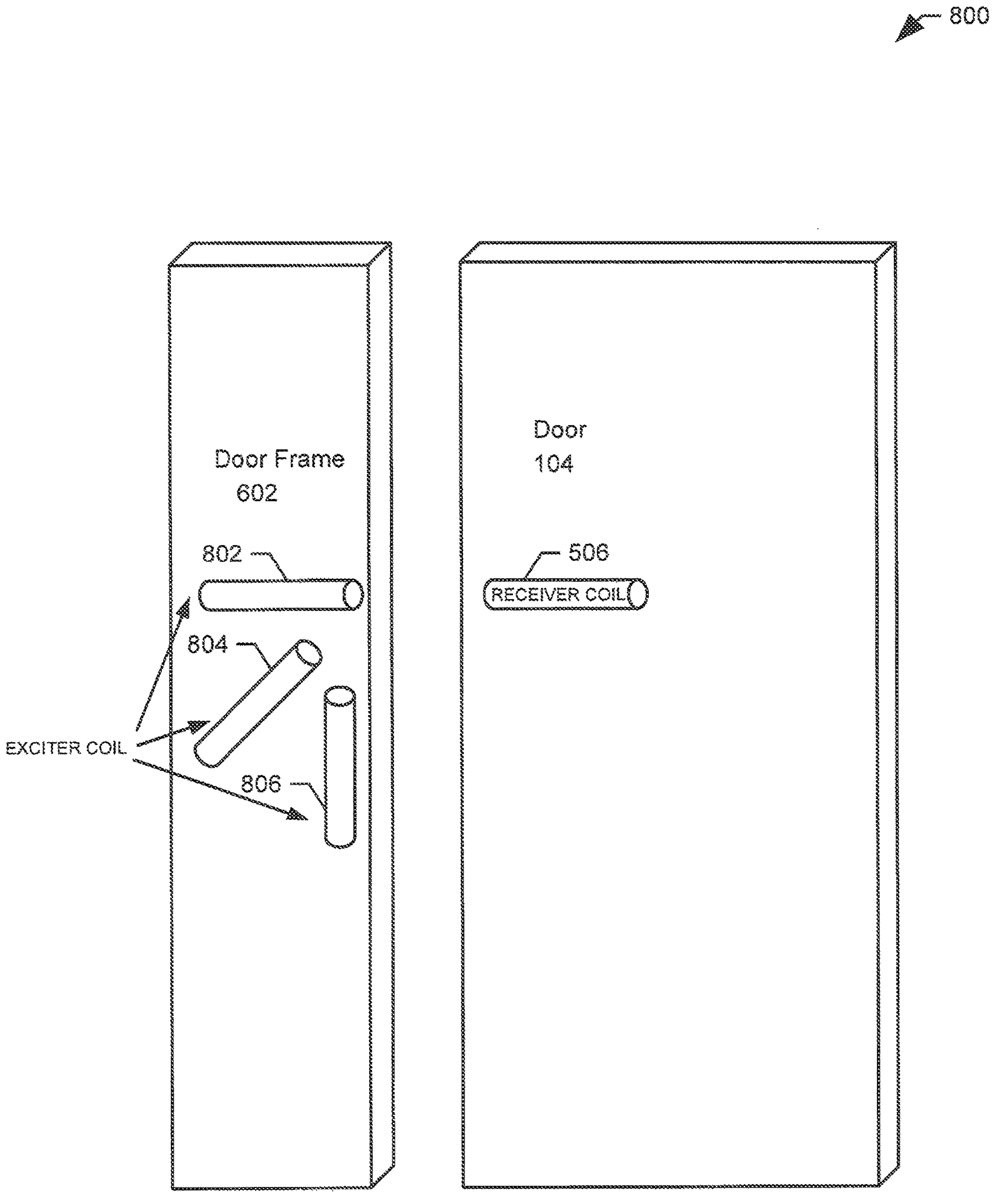
FIG. 8 is diagram illustrating yet another alternate physical implementation of certain components of an embodiment of the wireless battery charging system.

FIG. 8 is diagram illustrating a physical implementation of certain components of an embodiment of the wireless battery charging system 800. In this embodiment, the solenoid 506 associated with the electronic lock module 106, also referred to as the receiver antenna, is mounted on (or within) the door 104. Mounting positions 802, 804 and 806 show different possible mounting locations in which the solenoid 528 associated with the electronic control module 102, also referred to as the exciter antenna, is mounted on (or within) the door frame 602. These mounting positions 802, 804 and 806 are possible because the solenoids 528 and 506 do not have to be coaxial in order to establish the unidirectional inductively coupled wireless communications link 536. In an embodiment, the exciter antenna 528 can be up to 1 inch from the receiver antenna 506, and offset center-to-center by up to 0.5 inches.

Figure 9:
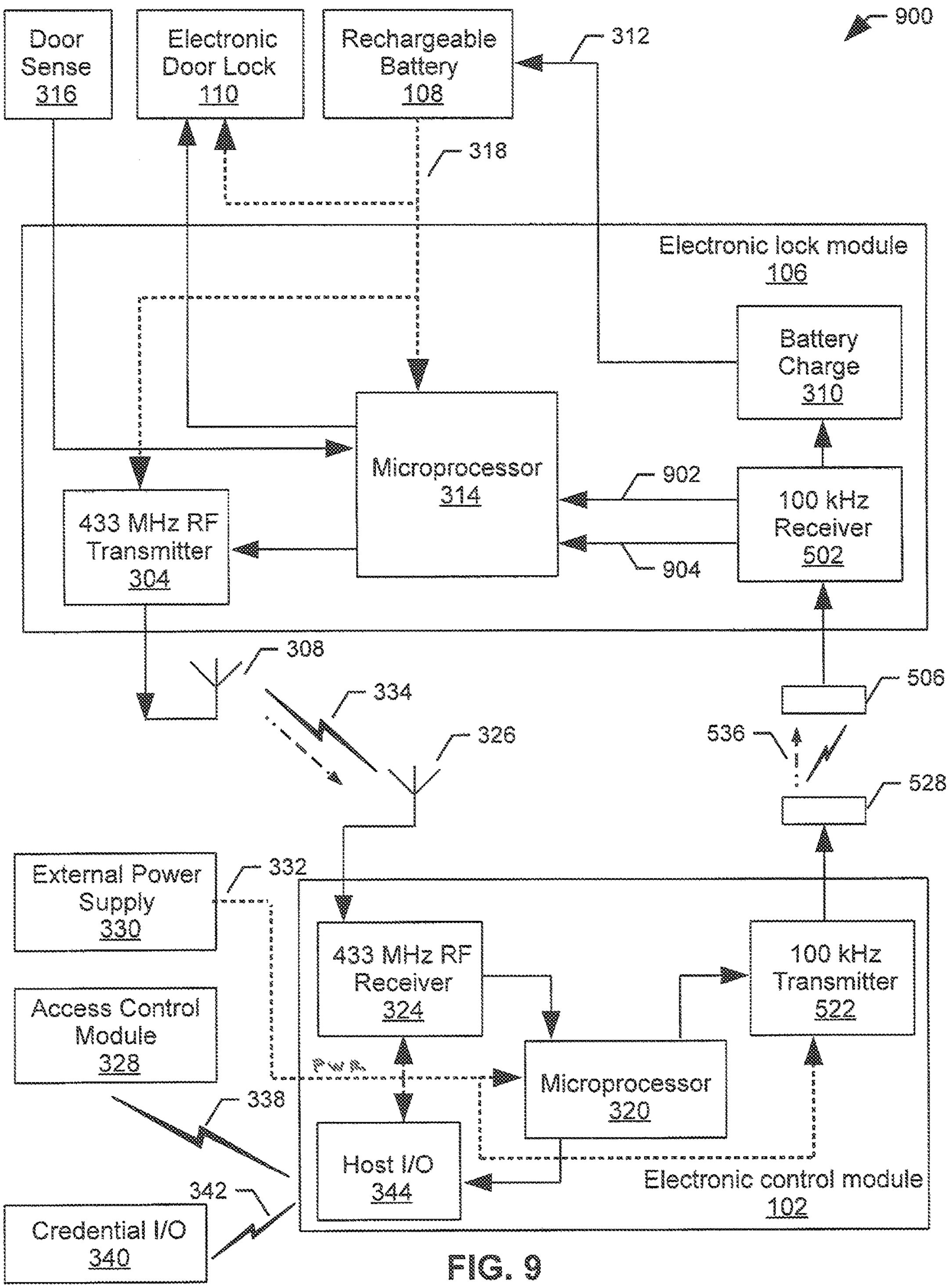
FIG. 9 is a block diagram illustrating an embodiment of a wireless battery charging system in which the wireless battery charging system is configured to measure a received signal strength.

FIG. 9 is a block diagram illustrating an embodiment of a wireless battery charging system 900 in which the wireless battery charging system is configured to measure a received signal strength. Many of the components shown in FIG. 9 are similar to the components shown in FIG. 5 and, therefore, are identified with the same reference numbers. This embodiment shows the electronic control module 102 and the electronic lock module 106. Also shown are the rechargeable battery 108 and the electronic door lock 110. In one embodiment, the electronic lock module 106 includes the microprocessor 314, the 433 MHz RF transmitter 304, 100 kHz receiver 502, and the battery charge module 310. In one embodiment, the rechargeable battery 108 supplies power to the electronic door lock 110, the microprocessor 314, and the 433 MHz transmitter 304, via the electronic lock module power supply bus 318. The 433 MHz RF transmitter 304 receives a signal from microprocessor 314, and outputs an RF signal at a frequency of 433 MHz. This RF signal is output to RF antenna 308 for transmission through the unidirectional RF data communications link 334. The 100 kHz receiver 502 is powered by a wireless signal received by solenoid 506 over unidirectional inductively coupled wireless communications link 536. In other embodiments, the unidirectional link 536 may be comprised of a magnetically coupled link. The unidirectional inductively coupled wireless communications link 536 is configured to wirelessly transmit both data and a charging signal that is used to recharge the rechargeable battery 108.

In one embodiment, the electronic control module 102 includes microprocessor 320, 100 kHz transmitter 522, the 433 MHz RF receiver 324 and host I/O 344. In this embodiment, the microprocessor 320, the 100 kHz transmitter 522, the 433 MHz RF receiver 324 and the host I/O 344 are powered from external power supply 330 via the electronic control module power supply bus 332. The 100 kHz transmitter 522 receives a signal from microprocessor 320, and outputs a signal at a frequency of 100 kHz. This 100 kHz signal is output to solenoid 528 for transmission over the unidirectional inductively coupled wireless communications link 536. The 433 MHz RF receiver 324 receives an RF signal via the RF antenna 326 over the unidirectional RF data communications link 334 and outputs this signal to the microprocessor 320.

In this embodiment, the unidirectional wireless RF data communications link 334 and the unidirectional inductively coupled wireless communications link 536 collectively constitute the bidirectional data link 112. Furthermore, the wireless charging link 114 is implemented by the unidirectional inductively coupled wireless communications link 536. Thus, the unidirectional inductively coupled wireless communications link 536 wirelessly transmits both data and the charging signal from the electronic control module 102 to the electronic lock module 106.

In one embodiment, the microprocessor 314 in the electronic lock module 106 periodically monitors the status of the charge on the rechargeable battery 108. The microprocessor 314 transmits this status of the charge on the rechargeable battery 108 as a data signal to the 433 MHz RF transmitter 304, which outputs this data signal to the RF antenna 308 that is electrically coupled to the 433 MHz RF transmitter 304. The RF antenna 308 transmits the data signal comprising the status of the rechargeable battery 108 over the unidirectional RF data communications link 334. This data signal is received by the RF antenna 326 electrically coupled to the 433 MHz RF receiver 324 that is a part of the electronic control module 102. The data signal received by the 433 MHz RF receiver 324 is transmitted to the microprocessor 320. The microprocessor 320 compares the received data signal, which is the status of the charge on the rechargeable battery, with a threshold value.

If the status of the charge on the rechargeable battery is less than the threshold value, the microprocessor 320 transmits a charging signal to the 100 kHz transmitter 522. The 100 kHz transmitter 522 transmits this charging signal to solenoid 528 which is electrically coupled to the 100 kHz transmitter 522. The solenoid 528 wirelessly transmits the charging signal over the unidirectional inductively coupled wireless communications link 536. The charging signal is wirelessly received by the solenoid 506 which is electrically coupled to the 100 kHz receiver 502. The solenoid 506 transmits the received charging signal to the 100 kHz receiver 302. The charging signal is used to power the 100 kHz receiver 502 and the battery charge module 310, and the charging signal is also transmitted to the battery charge module 310, which transmits the charging signal to charge the rechargeable battery 108 via charging path 312. This embodiment implements the non-continuous charging method. In this embodiment, data from the electronic control module 102 is wirelessly transmitted to the electronic lock module 106 via the unidirectional inductively coupled wireless communications link 536 in a non-continuous manner, along with the wirelessly transmitted charging signal.

In another embodiment, the microprocessor 320 transmits a charging signal to the 100 kHz transmitter 522 regardless of the status of the charge on the rechargeable battery 108. The 100 kHz transmitter 522 transmits this charging signal to solenoid 528 which is electrically coupled to the 100 kHz transmitter 522. The solenoid 528 wirelessly transmits the charging signal over the unidirectional inductively coupled wireless communications link 536. The charging signal is wirelessly received by the solenoid 506 which is electrically coupled to the 100 kHz receiver 502. The solenoid 506 transmits the received charging signal to the 100 kHz receiver 302. The charging signal is used to power the 100 kHz receiver 502 and the battery charge module 310, and the charging signal is also transmitted to the battery charge module 310, which transmits the charging signal to charge the rechargeable battery 108 via charging path 312. This embodiment implements the continuous charging method. In this embodiment, data from the electronic control module 102 can be wirelessly transmitted to the electronic lock module 106 via the unidirectional inductively coupled wireless communications link 536 in a continuous manner, along with the wirelessly transmitted charging signal.

In some embodiments, both solenoids 528 and 506 and the associated transmitter 522 and receiver 502 are resonant at (i.e., are tuned to) a frequency of 100 kHz. In other embodiments, the resonant frequency may be a frequency different from 100 kHz.

In other embodiments, the door sense module 316 monitors a status of the door 104, such as door open, door ajar, door shut and latch/bolt position sense. The door sense module 316 periodically transmits a door status data signal to the microprocessor 314. This door status data signal is transmitted by the microprocessor 314 to the 433 MHz RF transmitter 304, which then transmits this data signal to RF antenna 308 that is electrically coupled to the 433 MHz RF transmitter 304. The door status data signal is transmitted by the RF antenna 308 over the unidirectional RF data communications link 334. The door status data signal is received by RF antenna 326 that is electrically coupled to the 433 MHz RF receiver 324. RF antenna 326 transmits the received door status data signal to the 433 MHz RF receiver 324, which then transmits the door status data signal to microprocessor 320 for subsequent processing.

In other embodiments, the electronic lock module 106 periodically transmits a data signal to the electronic control module 102 via the unidirectional RF data communications link 334. The contents of this data signal include the charge status on the rechargeable battery 108 and the status of the door. This periodically transmitted data signal may be referred to as a heartbeat signal. In other embodiments, the monitoring of the door status is performed by the electronic control module 102.

Electronic control module 102 is also electrically coupled via an electrical coupling 342 to credential I/O module 340. The credential I/O module 340 reads an input from a user for authentication purposes. User input methods include, for example, magnetic cards, biometrics, keypads, and smart devices such as smartphones and PDAs that use communication protocols such as Near Field Communication (NFC). The credential I/O module 340 transmits user input to the electronic control module 102 for authentication. The credential I/O module 340 also receives input from the electronic control module 102 via the electrical coupling 342, including user feedback that includes, but is not limited to, audio-visual signals either confirming or denying permission to enter.

In some embodiments, the credential I/O module 340 is physically attached to the door 104 and electrically coupled to the electronic lock module 106. In this embodiment, the credential I/O module 340, powered by rechargeable battery 108, reads an input from a user for authentication purposes. The credential I/O module 340 transmits user input to the electronic control module 102 for authentication via the unidirectional RF data communications link 334. The credential I/O module 340 also receives input from the electronic control module 102 via the unidirectional inductively coupled wireless communications link 536, including user feedback that includes, but is not limited to, audio-visual signals either confirming or denying permission to enter.

Electronic control module 102 is also electrically coupled via an electrical coupling 338 to the access control module 328 via the host I/O 344. The interface between the host I/O 344 and the access control module 328 is used for purposes such as user authentication, discussed in greater detail in the description of FIG. 4. In some embodiments, the electrical coupling 338 between the host I/O 344 and the access control module 328 is realized by standard connectivity methods that include, for example, Ethernet or Wi-Fi.

In some embodiments, 100 kHz receiver 502 outputs two signals to microprocessor 314—an analog signal 902 and a digital signal 904. Analog signal 902 is a rectified and filtered version of the charging signal, while digital signal 904 includes the demodulated data encoded onto the charging signal. Microprocessor 314 receives the demodulated data and processes it accordingly (for example, processing command signals to lock or unlock the door). Microprocessor 314 also reads in analog signal 902. In some embodiments, analog signal 902 is digitized by an on-chip analog-to-digital converter (ADC) associated with microprocessor 314. Microprocessor 314 processes digitized analog signal 902 via software-based methods such as signal averaging to determine, for example, the average signal strength. The average signal strength is representative of the signal strength associated with the charging signal as received by 100 kHz receiver 502. In some embodiments, the signal strength associated with the charging signal as received by 100 kHz receiver 502 decreases when the door is open (as compared to a reference signal strength associated with the charging signal as received by 100 kHz receiver 502 when the door is shut), due to the increased distance between solenoid 528 and solenoid 506, as well as due the associated lack of alignment between solenoid 528 and solenoid 506. This reduction in the signal strength associated with the charging signal as received by 100 kHz receiver 502 and as determined by microprocessor 314 can be used as an indicator of a door open condition. This, in turn, can be used for security applications such as triggering alarms if necessary. A detailed description of this functionality is described subsequently.

Figure 10:
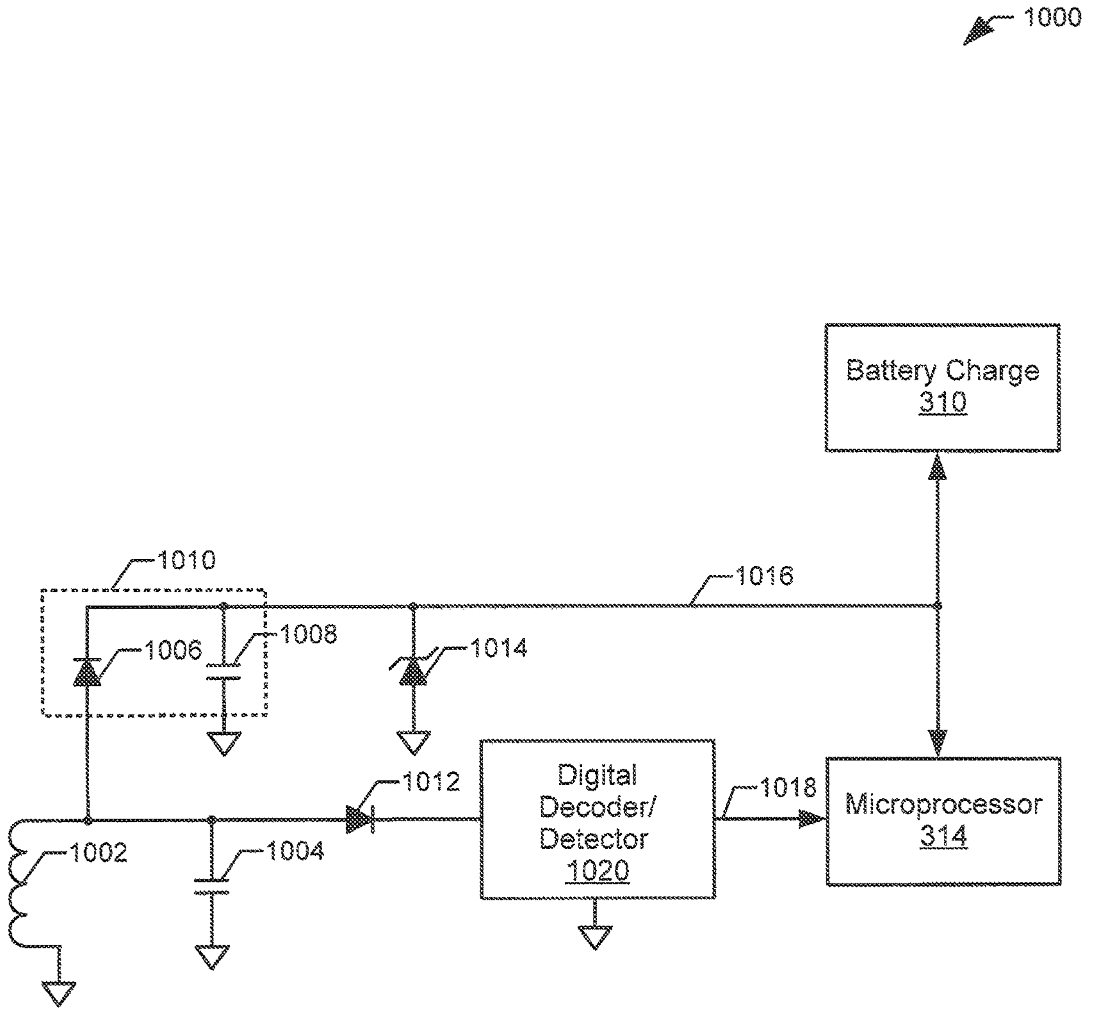
FIG. 10 is an electrical circuit diagram illustrating an embodiment of a portion of the wireless battery charging system that includes circuitry associated with receiving a wireless signal.

FIG. 10 is an electrical circuit diagram illustrating an embodiment of a portion of a wireless battery charging system 1000 that includes circuitry associated with receiving a wireless signal. In some embodiments, a portion of the wireless battery charging system 1000 includes a receiver antenna 1002, where receiver antenna 1002 may be similar in functionality to solenoid 506. A half-wave rectifier 1010 comprised of a diode 1006 and a filter capacitor 1008 is electrically coupled to receiver antenna 1002. Filter capacitor 1008 functions to filter and smooth the rectified waveform that is output from diode 1006. In some embodiments, half-wave rectifier 1010 may be replaced with a full-wave rectifier circuit. A Zener diode 1014 provides overvoltage protection to the circuit. The output of half-wave rectifier 1010 is similar to analog signal 902, and is transmitted via an electrical path 1016 to battery charge module 310 and microprocessor 314. The output of receiver antenna 1002 is also electrically coupled to a digital decoder/detector 1020, via a parallel capacitor 1004 and a diode 1012, where parallel capacitor 1004 is a part of a resonant circuit that includes receiver antenna 1002 and parallel capacitor 1004, while diode 1012 functions as an amplitude modulation (AM) detector, and extracts demodulated data from the received signal. Digital decoder/detector 1020 receives the demodulated data from diode 1012. This demodulated data is digital data. Digital decoder/detector 1020 processes the digital data, and then transmits this processed digital data to microprocessor 314 via a digital path 1018, where the transmission of the digital data via digital path 1018 to microprocessor 314 comprises digital signal 904.

Figure 11:
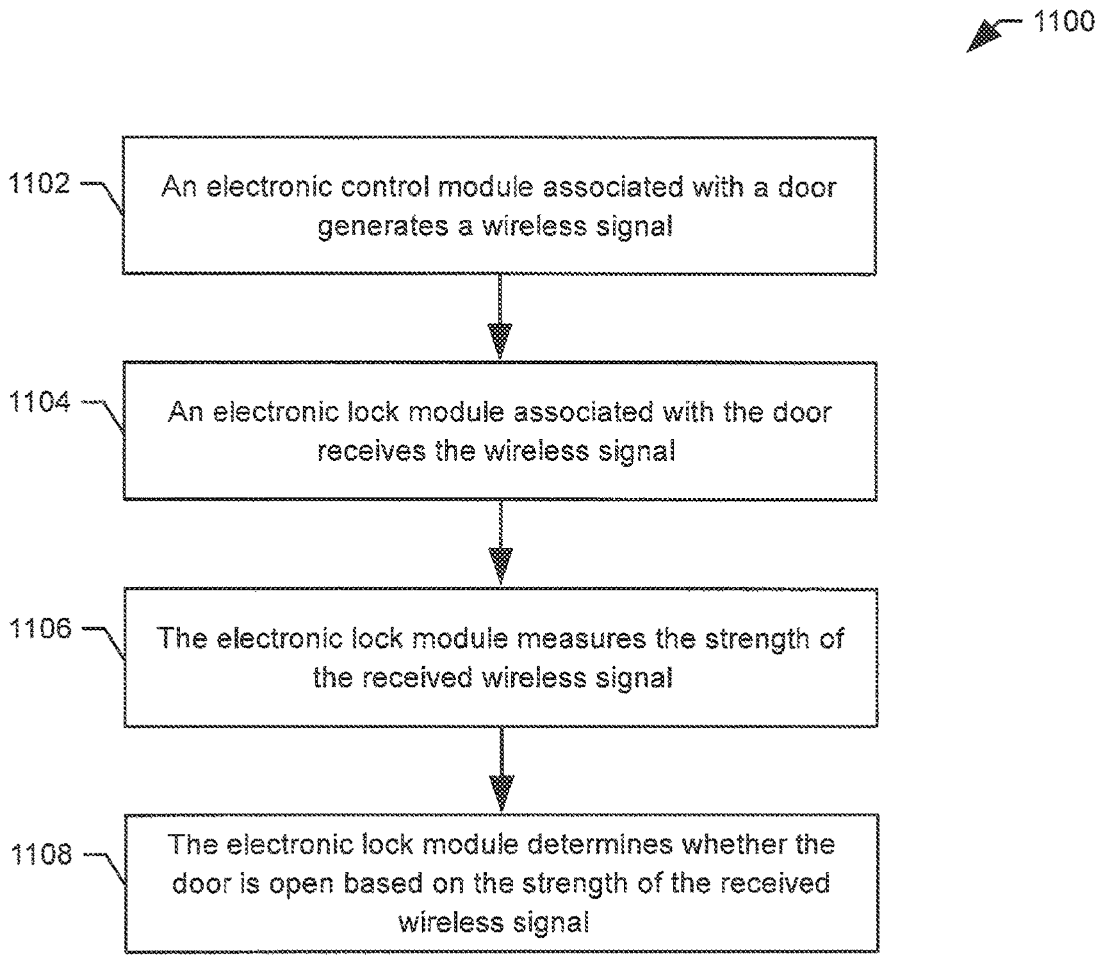
FIG. 11 is a process flow diagram illustrating a method for determining whether a door is open based upon a measurement of received wireless signal strength.

FIG. 11 is a process flow diagram illustrating a method 1100 for determining whether a door is open based upon a measurement of received wireless signal strength. An electronic control module associated with a door generates a wireless signal at 1102. In some embodiments, the electronic control module may be similar to electronic control module 102, and the wireless signal may be similar to the charging signal used to charge rechargeable battery 108. At 1104, an electronic lock module associated with the door receives the wireless signal. In some embodiments, the electronic lock module may be similar to electronic lock module 106. Next, at 1106 the electronic lock module measures the strength of the received wireless signal. The process of measuring the strength of the received wireless signal may include a combination of hardware and software-based approaches using, for example, the circuitry, the associated microprocessor 314 and the software program associated with microprocessor 314 as discussed above in the description of FIG. 10. In some embodiments, the process of measuring the strength of the received wireless signal includes digitizing the rectified voltage generated along electrical path 1016, where the digitization process is done by an analog-to-digital converter (ADC) associated with microprocessor 314. In some embodiments, the strength of the received wireless signal is clamped by Zener diode 1014. The digitized rectified voltage is then read by microprocessor 314, and software processing such as signal averaging may be performed by microprocessor 314 on the digitized rectified voltage to compute average received signal strength.

At 1108, the electronic lock module determines whether the door is open based on the strength of the received wireless signal. In some embodiments, the electronic lock module measures the strength of the received wireless signal when the door is closed. This strength of the received wireless signal is substantially at a maximum value that can be measured by the electronic lock module, as the door closed condition corresponds to maximum alignment between the transmitter antenna and receiver antenna associated with the electronic control module and the electronic lock module respectively. This maximum alignment, in turn, is associated with substantially maximum power transfer associated with the wireless signal. Any deviation from the maximum alignment between the antennas (as associated with, for example, the door being opened) results in a drop in the measured strength of the received wireless signal as received by the electronic lock module. The drop in the measured strength of the received wireless signal is also associated with the increase in the distance between the transmitter antenna and receiver antenna, also associated with (among other things) the door being open. In other words, a drop in the measured strength of the received wireless signal as received by the electronic lock module is associated with the door being open, or some other anomalous condition. Appropriate software running on, for example, microprocessor 314 can measure the loss in the strength of the received wireless signal and determine whether the door is open. In some embodiments, when the strength of the received wireless signal drops to 80 percent or less of the signal strength associated with the door being closed, the system can determine that the door is open.

Figure 12A:
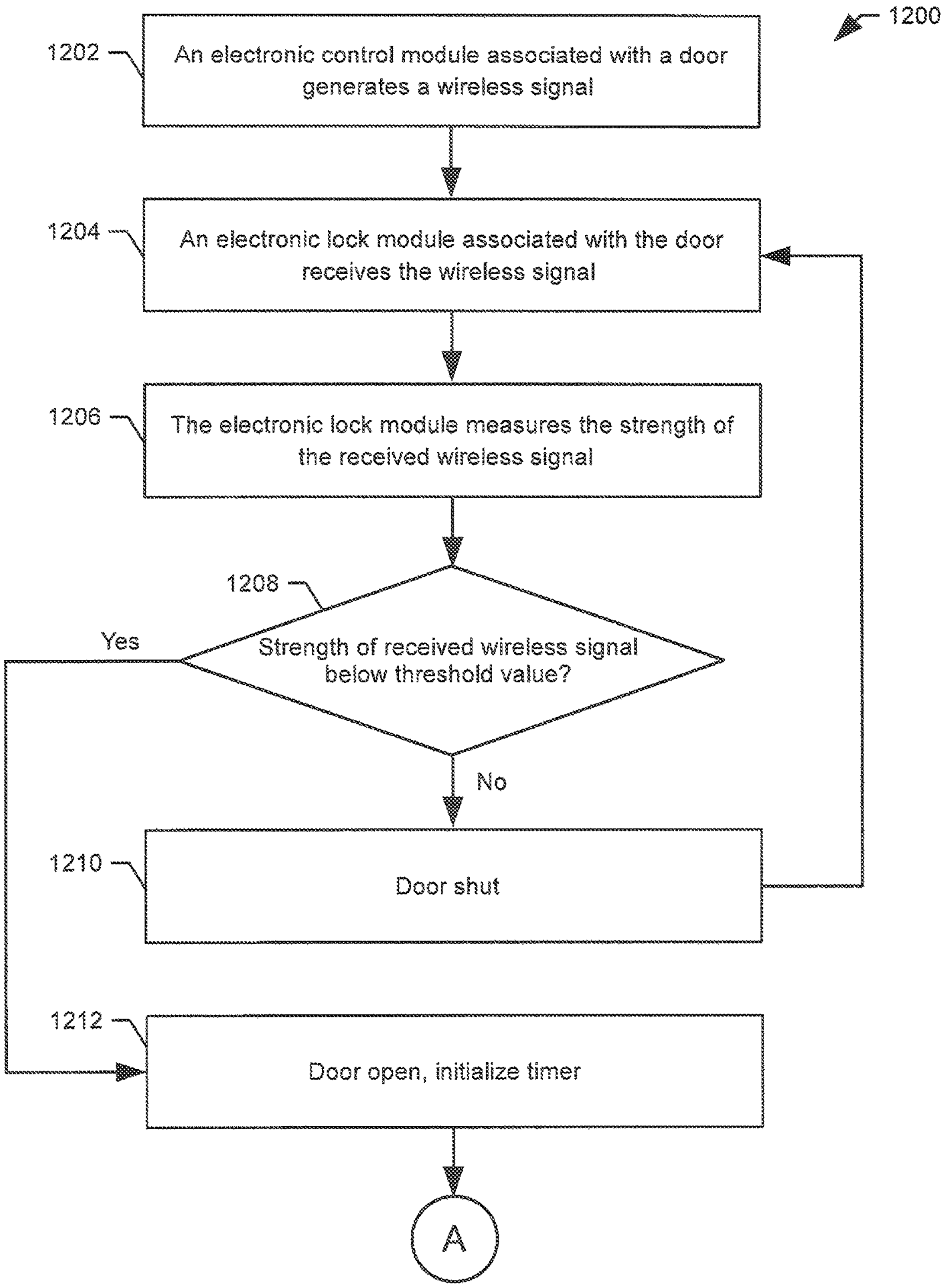
FIGS. 12A and 12B together form a process flow diagram illustrating a method for determining whether a door is open based upon a measurement of received wireless signal strength while also performing security functions.
Figure 12B:
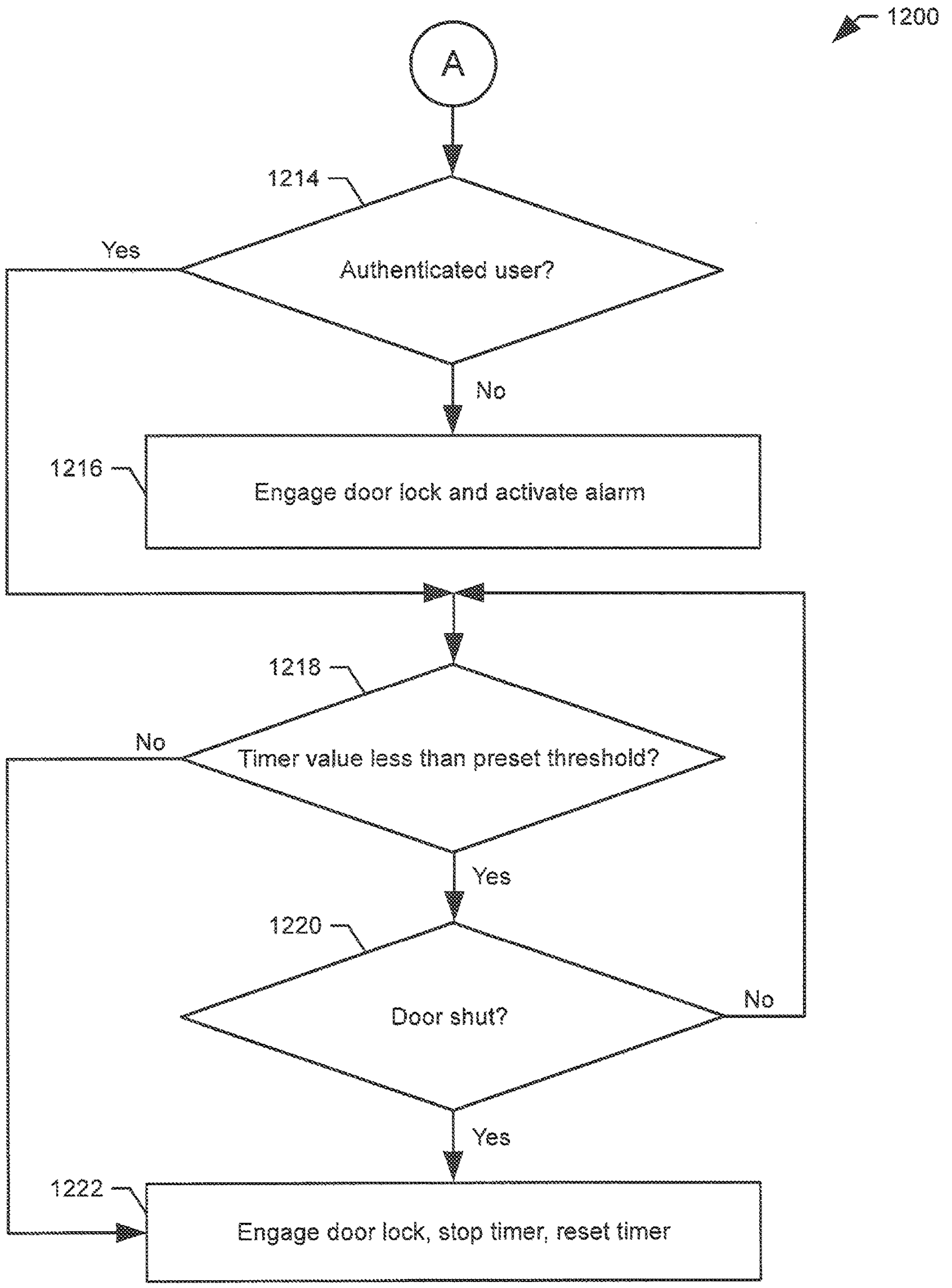

FIGS. 12A and 12B together form a process flow diagram illustrating a method 1200 for determining whether a door is open based upon a measurement of received wireless signal strength while also performing security functions. The method 1200 is a more elaborate description of the method 1100. At 1202, an electronic control module associated with a door generates a wireless signal. This step is similar to step 1102 associated with method 1100. At 1204 an electronic lock module associated with the door receives the wireless signal, and at 1206 the electronic lock module measures the strength of the received wireless signal. At 1208, the method checks to see if the strength of the received wireless signal as measured by the electronic lock module is less than a predetermined threshold value. (The predetermined threshold value may be determined, for example, as in the description of FIG. 11.) In some embodiments, the predetermined threshold value is associated with maximum alignment between the transmitter antenna and the receiver antenna associated with the electronic control module and the electronic lock module respectively. If the strength of the received wireless signal as measured by the electronic lock module is not less than a predetermined threshold value, then the method goes to 1210, where it determines that the door is shut. The method then returns to 1204.

If, at 1208, the method determines that the strength of the received wireless signal is less than the predetermined threshold value, then the method goes to 1212, where it determines that the door is open. In some embodiments, at 1212 the method might initialize a timer to measure the time elapsed since the time the method determines that the door is open. The method then continues to A, with a continued description in the next figure.

FIG. 12B is a continued description of the method 1200 from FIG. 12A. Starting at A, the method 1200 goes to 1214 and checks to see if the opening of the door is associated with an authorized user whose credentials have been appropriately authenticated by, for example, the electronic control module, the electronic lock module, or by any other suitable authentication device. If the method determines that the opening of the door is not associated with an authorized user then the method goes to 1216, where the electronic lock module engages a door lock associated with the door and activates an alarm to indicate an anomalous door open condition. Another example of an anomalous door open condition is when the door is open without the electronic lock module receiving an authorization from the electronic control module to unlock the door, indicating a possibility that the door might have been forced open. The reengagement of the door lock ensures that the door cannot be reopened once it is shut. The associated alarm may be an audible alarm generated by the electronic lock module or any other type of alarm, warning, or notification. The electronic lock module may also transmit the anomalous door open status to the electronic control module via, for example, unidirectional RF data communications link 334.

At 1214, if the method determines that the opening of the door is associated with an authorized user whose credentials have been appropriately authenticated, then the method proceeds to 1218, where it checks to see if the timer value associated with the timer initialized in 1212 is greater than a preset threshold, where the preset threshold signifies a time limit for which the door lock remains disengaged. In some embodiments, the time limit is determined by the typical amount of time it would take for a person to open the door after successful authentication. In other embodiments, the electronic lock module can engage the door lock when a door open condition is detected. Using methods like this to set a time limit can be advantageous in ensuring that the door remains unlocked for the minimum required amount of time. This feature is important from a security perspective. At 1218, if the timer value is greater than or equal to the preset threshold, the method proceeds to 1222, where the door lock is activated by the electronic lock module. At 1222 the method also stops the timer and resets the timer for the next cycle of operation.

Returning back to 1218, if the timer value is less than the preset threshold, then the method goes to 1220, where it checks to see whether the door is shut. If the door is not shut, then the method goes back to 1218. In some embodiments, the electronic lock module can periodically communicate a door open status to the electronic control module via, for example, unidirectional RF data communications link 334. On the other hand, if, at 1220, the door is shut then the method proceeds to 1222, where the door lock is activated by the electronic lock module. At 1222 the method also stops the timer and resets the timer for the next cycle of operation.

Figure 13:
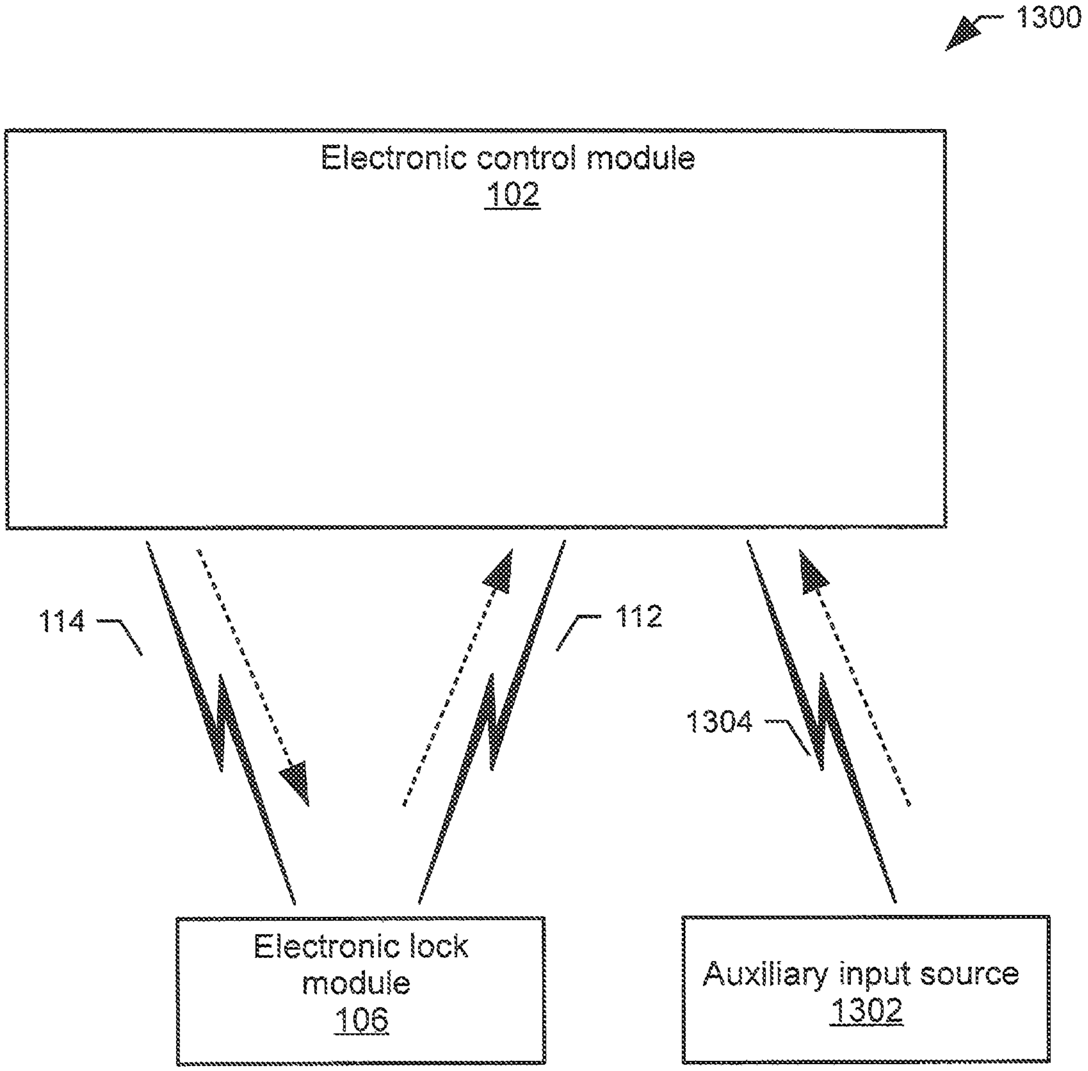
FIG. 13 is a block diagram illustrating an embodiment of a wireless battery charging system configured to process information from multiple input sources.

FIG. 13 is a block diagram illustrating an embodiment of a wireless battery charging system 1300 configured to process information from multiple input sources. In some embodiments, wireless battery charging system includes electronic control module 102 and electronic lock module 106, where electronic control module 102 and electronic lock module 106 are configured to communicate via bidirectional data communications link 112 and wireless charging link 114. The operation of this system is as described earlier. Appropriate authentication can be used to ensure that an electronic control module and an electronic lock module comprise a matched set. In other words, a first electronic lock module paired with a first electronic control module will not accept or process information from a second electronic control module and vice versa. Similarly, the first electronic control module will not accept or process information from a second electronic lock module that is not paired with the first electronic control module. This feature allows multiple combinations of matched electronic control modules and electronic lock modules to be used in an environment such as a school. Classrooms can be equipped with such door locking systems that wirelessly recharge the battery associated with the electronic lock module.

In some embodiments, for a matched pair comprising, for example, electronic control module 102 and electronic lock module 106, a third matching device, an auxiliary input source 1302, can be configured to transmit data to electronic control module 102 via a unidirectional wireless data link 1304. Auxiliary input source 1302 can, for example, issue a request to electronic control module 102 via unidirectional wireless data link 1304, where the request may be to lock or unlock the associated door. Electronic control module 102 may receive this request and perform the necessary action of locking or unlocking the door via a command issued to electronic lock module 106 via bidirectional data communications link 112. One more auxiliary input sources such as auxiliary input source 1302 may be matched to the matched pair comprising electronic control module 102 and electronic lock module 106. The application of this system may be used for security purposes. For example, in the case of an emergency in school (for example, an active shooter situation), a teacher in possession of an auxiliary input source may issue a command to lock the associated classroom door, thereby preventing anyone from entering the classroom, and hence increasing the security of the classroom.

Figure 14A:
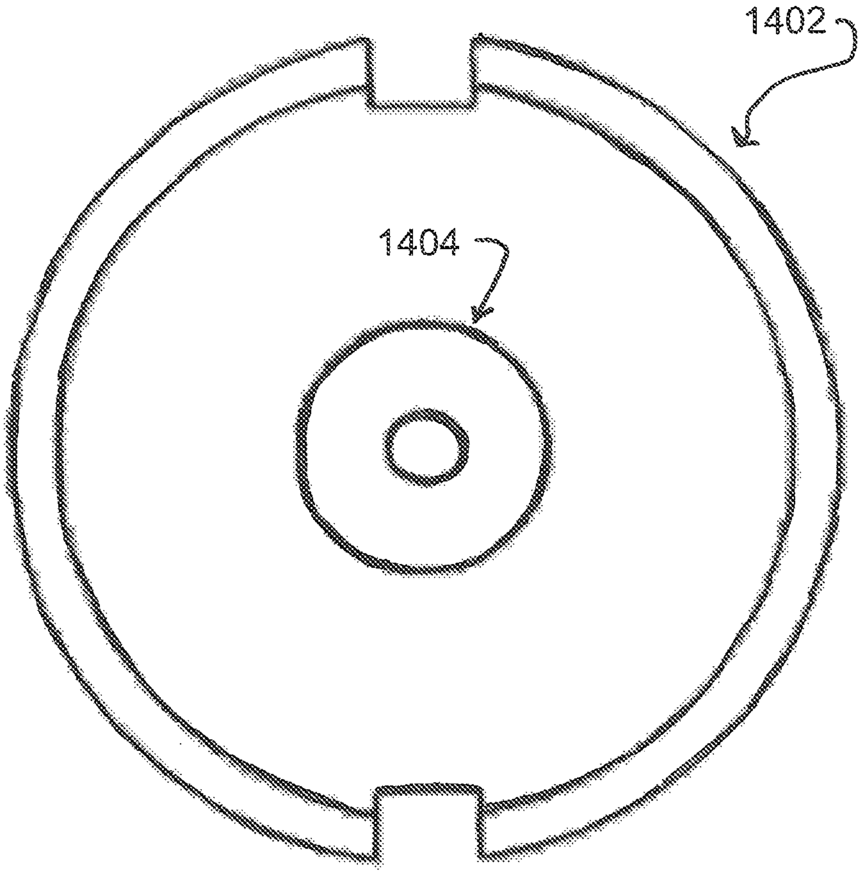
FIG. 14A is a front elevational diagram of a ferrite pot core solenoid preform which may be used with an embodiment.
Figure 14B:
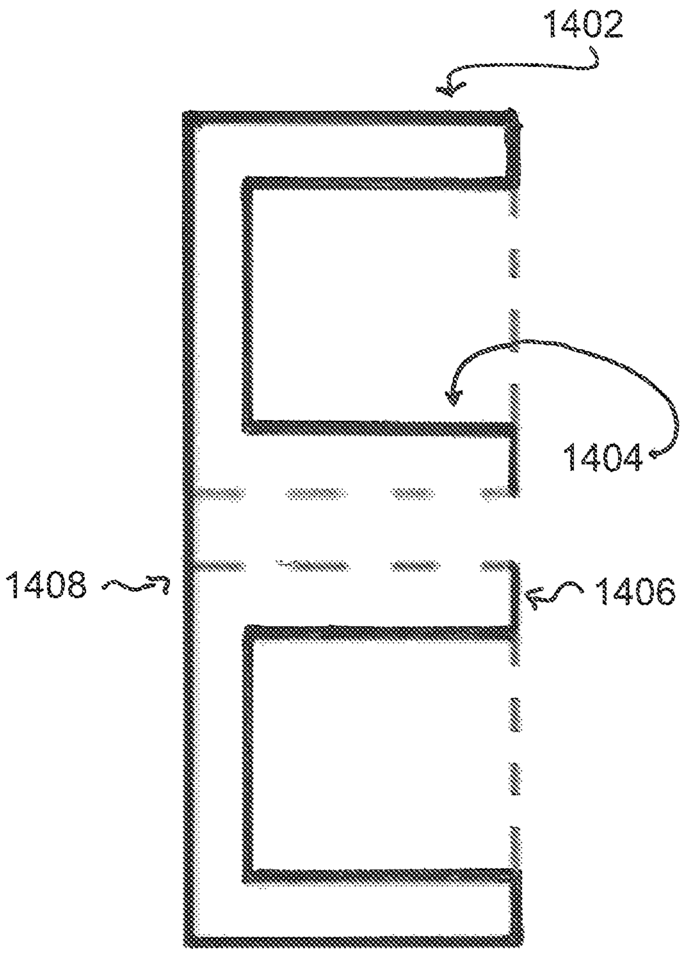
FIG. 14B is a side elevational diagram of the ferrite pot core solenoid preform in accordance with that shown in FIG. 14A showing details of the internal structure of the ferrite pot core preform.

FIG. 14A is a front elevational diagram of a ferrite pot core solenoid preform which may be used with one or more embodiments. FIG. 14B is a side elevational diagram of the ferrite pot core solenoid preform in accordance with FIG. 14A showing details of the internal structure of the ferrite pot core preform.

An antenna for transmitting electromagnetic energy for charging is may be formed as a solenoid of wire wrapped around spindle 1404 of preform 1402. Preform 1402 is formed of a ferrite material and acts to constrain the magnetic flux lines formed by a solenoid formed of wire (not shown) wrapped around spindle 1404 so that the flux lines preferentially exit the pot core out of its open side 1406 rather than up, down or out the rear side 1408. This is particularly helpful when the material surrounding the pot core comprises metal as is typically the case in mullions of interior and exterior doors of commercial buildings. Without the pot core, more power would be required to achieve the same delivered signal strength to a receiving antenna in the mating door. A similar pot core type antenna may be used on the mating door as an antenna, however, in many cases the door will not comprise metal (e.g., a wooden door) and the interfering effects of the metal with the charging signal will not be as pronounced on the door side. So, while a pot core is particularly helpful on the mullion side of the door/mullion gap, it is less critical on the door side in many circumstances from a technical perspective. The pot core approach, however, does provide a convenient compact antenna which makes for easy installation on both sides of the mullion/door gap and thus may advantageously be used on both sides for that reason.

In one embodiment an RFID access control reader may be integrated with the electronic lock module and mounted therewith as an integrated assembly so that presenting an authorized RFID credential to the access control reader will generate a signal causing the door lock to unlock directly in response to the access control reader sending an unlock command to the electronic lock module.

While exemplary embodiments and applications have been shown and described, it would be apparent to those skilled in the art having the benefit of this disclosure that numerous modifications, variations and adaptations not specifically mentioned above may be made to the various exemplary embodiments described herein without departing from the scope of the invention which is defined by the appended claims.

What is claimed is:

1. An apparatus comprising:

an electronic lock module configured to control the state of a door lock for a door mounted in a door frame; and an electronic control module physically separate from the electronic lock module and configured to communicate with the electronic lock module, wherein the electronic control module is configured to generate a wireless signal and communicate the wireless signal to the electronic lock module, wherein the electronic lock module is configured to receive the wireless signal and measure a strength of the wireless signal, and wherein the electronic lock module is configured to determine whether the door is open based on a measured strength of the wireless signal.

2. The apparatus of claim 1, further comprising:

a rechargeable battery electrically coupled to the electronic lock module;

wherein the electronic control module is configured to transmit a wireless charging signal to the electronic lock module using a first antenna coupled to the electronic control module and a second antenna coupled to the electronic lock module, and wherein the electronic lock module is configured to use the wireless charging signal to charge the rechargeable battery.

3. The apparatus of claim 2, wherein the first antenna comprises a ferrite pot core preform and a solenoid disposed around a spindle of the ferrite pot core preform.

4. The apparatus of claim 2, wherein the second antenna comprises a ferrite pot core preform and a solenoid disposed around a spindle of the ferrite pot core preform.

5. The apparatus of claim 2, wherein the first and the second antenna each comprise a ferrite pot core preform and a solenoid disposed around a spindle of the ferrite pot core preform.

6. The apparatus of claim 1, wherein the electronic lock module is configured to determine that the door is open when a measured strength of the wireless signal is below a predetermined threshold.

7. The apparatus of claim 1, wherein the electronic lock module is configured to generate a wireless data signal between the electronic lock module and the electronic control module.

8. The apparatus of claim 7, wherein a notification corresponding to the door being open is transmitted from the electronic lock module to the electronic control module via the wireless data signal.

9. The apparatus of claim 1, wherein the electronic lock module is configured to operate a lock associated with the door between an activated state and a deactivated state.

10. The apparatus of claim 9, wherein a door open condition is realized after the lock is set to the deactivated state by the electronic lock module.

11. The apparatus of claim 10, wherein the electronic lock module is configured to set the lock to the activated state after a predetermined time interval.

12. The apparatus of claim 10, wherein the electronic lock module is configured to set the lock to the activated state after a measured strength of the wireless signal increases to a level that is above a predetermined threshold wireless signal level associated with the door being closed.

13. The apparatus of claim 2, wherein the electronic lock module is configured to determine that the door is open when a measured strength of the wireless signal is below a predetermined threshold.

14. The apparatus of claim 2, wherein the electronic lock module is configured to generate a wireless data signal between the electronic lock module and the electronic control module.

15. The apparatus of claim 14, wherein a notification corresponding to the door being open is transmitted from the electronic lock module to the electronic control module via the wireless data signal.

16. The apparatus of claim 2, wherein the electronic lock module is configured to operate a lock associated with the door.

17. The apparatus of claim 16, wherein a notification corresponding to the door being open is transmitted from the electronic lock module to the electronic control module via the wireless data signal.

18. The apparatus of claim 17, wherein a door open condition is realized after the lock is deactivated by the electronic lock module.

19. The apparatus of claim 18, wherein the electronic lock module is configured to set the lock to an activated state after a measured strength of the wireless signal increases to a level that is above a predetermined threshold wireless signal level associated with the door being closed.

20. A method comprising:

generating, with an electronic control module associated with a door, a wireless signal;

receiving the wireless signal with an electronic lock module associated with the door;

measuring, with the electronic lock module, a strength of the received wireless signal; and determining, with the electronic lock module, whether the door is open based on the measured strength of the received wireless signal;

using a wireless charging signal transmitted by the electronic control module to charge a battery coupled to the electronic lock module; and using the battery to power the electronic lock module.

21. The method of claim 20, further comprising:

using an RFID reader coupled to the electronic lock module to control a state of the electronic lock module, the available states of the electronic lock module including locked and unlocked.

22. The method of claim 21, further comprising:

powering the RFID reader with the battery.

23. The method of claim 20, further comprising:

transmitting the wireless charging signal from the electronic control module using a pot core antenna.

24. The method of claim 23, further comprising:

receiving the wireless charging signal at the electronic lock module using a pot core antenna.

* * * * *